(12) United States Patent
Kagawa

(10) Patent No.: US 10,593,077 B2
(45) Date of Patent: Mar. 17, 2020

(54) ASSOCIATING DIGITAL INK MARKUPS WITH ANNOTATED CONTENT

(71) Applicant: Ricoh Company, Ltd., Tokyo (JP)

(72) Inventor: Masaaki Kagawa, Tokyo (JP)

(73) Assignee: RICOH COMPANY, LTD., Tokyo (JP)

( * ) Notice: Subject to any disclaimer, the term of this patent is extended or adjusted under 35 U.S.C. 154(b) by 0 days.

(21) Appl. No.: 16/104,363

(22) Filed: Aug. 17, 2018

(65) Prior Publication Data

US 2019/0073808 A1 Mar. 7, 2019

(30) Foreign Application Priority Data

Sep. 5, 2017 (JP) ................................. 2017-170472

(51) Int. Cl.
*G06T 11/20* (2006.01)
*G06F 3/0484* (2013.01)
*G06F 3/0488* (2013.01)

(52) U.S. Cl.
CPC .......... *G06T 11/203* (2013.01); *G06F 3/0484* (2013.01); *G06F 3/04883* (2013.01); *G06T 2200/24* (2013.01)

(58) Field of Classification Search
None
See application file for complete search history.

(56) References Cited

U.S. PATENT DOCUMENTS

| 7,174,339 B1 * | 2/2007 | Wucherer | G06F 17/5004 |
| 8,181,103 B2 * | 5/2012 | Lin | G06F 17/242 |
| | | | 715/230 |
| 2005/0289452 A1 * | 12/2005 | Kashi | G06F 17/2247 |
| | | | 715/232 |
| 2015/0154443 A1 * | 6/2015 | Ookawara | G06F 17/2247 |
| | | | 715/234 |
| 2015/0248390 A1 * | 9/2015 | Gormish | G06F 17/241 |
| | | | 715/233 |
| 2016/0241609 A1 * | 8/2016 | Xin | H04L 65/403 |
| 2017/0134446 A1 | 5/2017 | Kitada et al. | |

FOREIGN PATENT DOCUMENTS

JP 2011-180948 9/2011

OTHER PUBLICATIONS

"Ink Markup Language (InkML)," W3C Recommendation Sep. 20, 2011; World Wide Web Consortium; Editors: Stephen M. Watt, University of Western Ontario and Maplesoft; Tom Underhill, Microsoft; Authors: Yi-Min Chee (until 2006 while at IBM); Katrin Franke (until 2004 while at Fraunhofer Gesellschaft); 67 page (Year: 2011).*

* cited by examiner

*Primary Examiner* — Edward Martello
(74) *Attorney, Agent, or Firm* — Xsensus LLP

(57) ABSTRACT

A terminal apparatus includes a display device and circuitry. The circuitry receives a predetermined instruction. In response to receiving the predetermined instruction, the circuitry changes attribute information of a stroke image associated with the predetermined instruction to specific attribute information, the specific attribute information identifying information in an area defined by the stroke image as information to be extracted. The circuitry controls the display device to display the stroke image associated with the predetermined instruction as a stroke image having the specific attribute information.

10 Claims, 18 Drawing Sheets

| MEETING ID | DATE | CARD ID | TIME | CONTENT DATA |
|---|---|---|---|---|
| 001 | 2017/2/10 | 100 | 10:00 | AudioData01.mpg |
| | | 100 | 10:01 | PageData01.jpg |
| | | 100 | 10:03 | StrokeImageData01.jpg |
| | | 102 | 10:05 | PageData02.jpg |
| | | 102 | 10:07 | StrokeImageData02.jpg |
| | | ⋮ | ⋮ | ⋮ |

| LINE TYPE | LINE COLOR | LINE WIDTH |
|---|---|---|
| Solid line ——— | Red | xx mm |
| Dotted line 1 ------- | Orange | yy mm |
| Dotted line 2 — — — | Yellow | zz mm |
| ⋮ | ⋮ | ⋮ |

| MEETING ID | DATE | CARD ID | IMPORTANT MATTER | PAGE DATA |
|---|---|---|---|---|
| 001 | 2017/2/10 | 100 | ImageData11.jpg | Page01.jpg |
| | | 100 | ImageData12.jpg | Page01.jpg |
| | | ⋮ | ⋮ | ⋮ |

ASSOCIATING DIGITAL INK MARKUPS WITH ANNOTATED CONTENT

CROSS-REFERENCE TO RELATED APPLICATION

This patent application is based on and claims priority pursuant to 35 U.S.C. § 119(a) to Japanese Patent Application No. 2017-170472, filed on Sep. 5, 2017, the entire disclosure of which is incorporated herein by reference.

BACKGROUND

Technical Field

The present disclosure relates to a terminal apparatus, an information processing system, and a display control method.

Description of the Related Art

A system is known that enables participants in a meeting or the like to share an image of a screen, files, characters, numerals, figures, and the like displayed on a computer.

In such a system, for example, when an instruction is given for highlighting an indicator mark that is input from a terminal apparatus, this indicator mark is displayed highlighted on the screen shared by the participants.

In the conventional system, when a user wants to give an instruction for highlighting an indicator mark, a user has to perform manipulation for displaying a setting screen for highlighting the indicator mark and selecting a desired form of the highlight.

SUMMARY

A terminal apparatus includes a display device and circuitry. The circuitry receives a predetermined instruction. In response to receiving the predetermined instruction, the circuitry changes attribute information of a stroke image associated with the predetermined instruction to specific attribute information, the specific attribute information identifying information in an area defined by the stroke image as information to be extracted. The circuitry controls the display device to display the stroke image associated with the predetermined instruction as a stroke image having the specific attribute information.

BRIEF DESCRIPTION OF THE DRAWINGS

A more complete appreciation of the embodiments and many of the attendant advantages and features thereof can be readily obtained and understood from the following detailed description with reference to the accompanying drawings, wherein:

FIG. 6 is a diagram illustrating an example of a content database, according to the first embodiment of the present disclosure;

FIG. 7 is a diagram illustrating an example of an attribute database, according to the first embodiment of the present disclosure;

FIG. 8 is a diagram illustrating an example of an important matter database, according to the first embodiment of the present disclosure;

Figure 1:
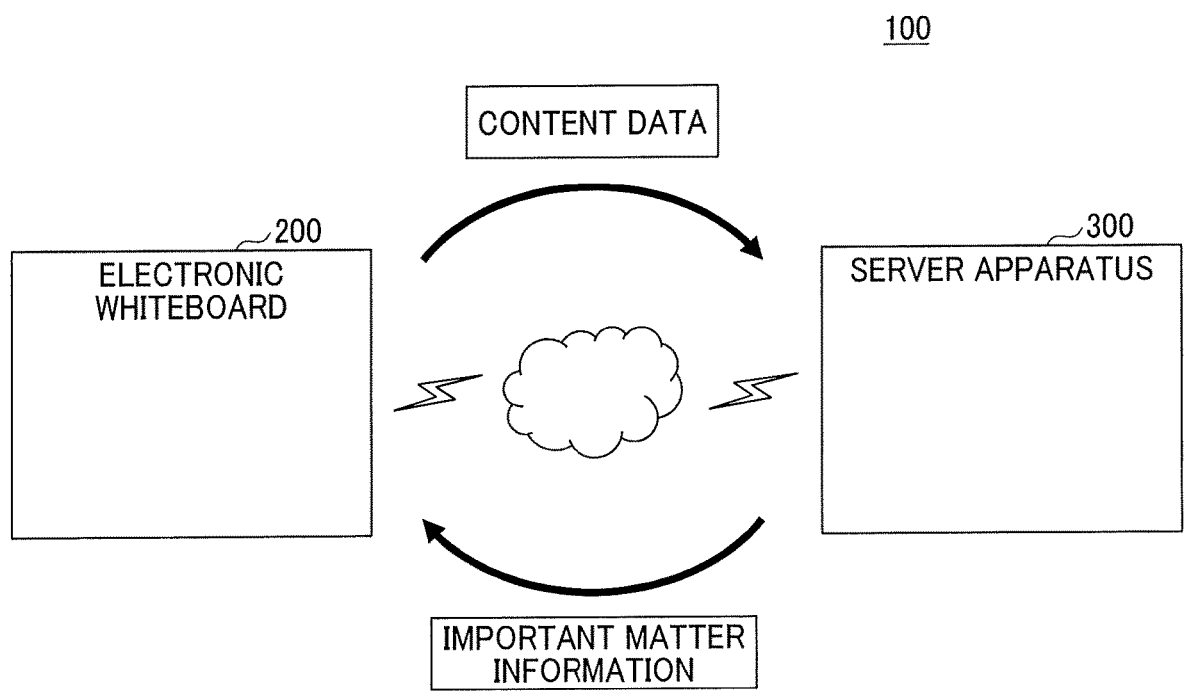
FIG. 1 is a schematic view illustrating an example of a configuration of an information processing system, according to a first embodiment of the present disclosure.

The accompanying drawings are intended to depict embodiments of the present invention and should not be interpreted to limit the scope thereof. The accompanying drawings are not to be considered as drawn to scale unless explicitly noted.

DETAILED DESCRIPTION

In describing embodiments illustrated in the drawings, specific terminology is employed for the sake of clarity. However, the disclosure of this specification is not intended to be limited to the specific terminology so selected and it is to be understood that each specific element includes all technical equivalents that have a similar function, operate in a similar manner, and achieve a similar result.

As used herein, the singular forms "a", "an", and "the" are intended to include the multiple forms as well, unless the context clearly indicates otherwise.

First Embodiment

Hereinafter, a description is given of a first embodiment of the present disclosure, with reference drawings. FIG. 1 is a schematic view illustrating an example of a configuration of an information processing system 100 according to the first embodiment.

The information processing system 100 according to the present embodiment includes an electronic whiteboard (electronic information board) 200 and a server apparatus 300. In the information processing system 100, the electronic whiteboard 200 and the server apparatus 300 are connected to each other via a network N. In other words, the information processing system 100 according to the present embodiment is an information processing system including a plurality of apparatuses including the electronic whiteboard 200.

In the information processing system 100 according to the present embodiment, the electronic whiteboard 200 transmits, to the server apparatus 300, stroke information indicating a handwritten entry of characters or images, image data obtained by capturing a screen of the electronic whiteboard 200, audio data obtained by an audio collecting device such as a microphone, etc. The electronic whiteboard 200 according to the present embodiment transmits, to the server apparatus 300, information indicating a date and time when the electronic whiteboard 200 acquires the stroke information, the image data, or the audio data, in association with the acquired data or information.

In another example, the electronic whiteboard 200 is communicable with a plurality of terminal apparatuses, and acquires image data or audio data from each of the terminal apparatuses. In this example, an image displayed on the electronic whiteboard 200 may be shared by the plurality of terminal apparatuses. In other words, the electronic whiteboard 200 is a shared terminal that displays a screen shared by the plurality of terminal apparatuses.

In the following description, various data transmitted from the electronic whiteboard 200 to the server apparatus 300 is referred to as content data. Accordingly, the content data according to the present embodiment includes any one or any combination of audio data, image data, moving image data, stroke information, and information indicating a date and time when corresponding data or information is received. The stroke information according to the present embodiment is coordinate information of a group of points indicating a trajectory of each stroke drawn by a user, when handwritten entry is performed on a touch panel. In the present embodiment, an image drawn with the group of points indicating a trajectory of each stroke is a stroke image.

Further, for example, when the electronic whiteboard 200 is used in a certain meeting, the electronic whiteboard 200 according to the present embodiment may transmit, to the server apparatus 300, information identifying a meeting name, in association with the content data acquired by the electronic whiteboard 200 during the meeting.

The server apparatus 300 according to the present embodiment stores the received content data. The server apparatus 300 may store the content data acquired from the electronic whiteboard 200 for each of a plurality of meetings. In addition, the electronic whiteboard 200 according to the present embodiment may accept an operation instruction (command) based on speech data using a speech recognition capability of the server apparatus 300, to operate in accordance with voice.

The audio data according to the present embodiment is data obtained by digitizing a waveform indicating all sounds picked up by the audio collecting device, such as voice of a person who speaks near the electronic whiteboard 200 and various sounds other than human voice. In other words, in the present embodiment, speech data indicating voice of a person who speaks near the electronic whiteboard 200 is a part of the audio data.

Further, the server apparatus 300 according to the present embodiment extracts important matter information indicating important matters in a meeting or the like performed using the electronic whiteboard 200, from the content data received from the electronic whiteboard 200.

Specifically, in response to receiving a predetermined instruction, the server apparatus 300 changes an image drawn based on stroke information input to the electronic whiteboard 200 to an image having a specific attribute. Further, the server apparatus 300 extracts, as important matter information, image data of an area specified by the image having the specific attribute.

In the following description, an image of one stroke drawn based on the stroke information is referred to as a "stroke image". Further, in the following description, to receive a handwritten entry to the electronic whiteboard 200 is referred to as "to receive an input of a stroke image". In other words, in the following description, a stroke image is kept being input, from when the electronic whiteboard 200 detects a contact of a user's hand or an electronic pen on a display until when the electronic whiteboard 200 detects that the user's hand or the electronic pen is made apart from the display.

Further, in the present embodiment, the specific attribute is an attribute that is set in advance. The predetermined instruction and a stroke image drawn with the specific attribute are associated with each other in advance.

The predetermined instruction according to the present embodiment includes, for example, tapping a specific position on the display of the electronic whiteboard 200, or drawing a stroke image of a specific shape. In other words, the predetermined instruction according to embodiment is received in response to a specific handwritten entry to the electronic whiteboard 200, instead of in response to a special-purpose operation for changing an attribute of a stroke image. This special-purpose operation is, for example, a series of operations of opening a window displaying a list of attributes of a stroke image to change an attribute of a stroke image, then selecting a desired attribute from the list, and then closing the window displaying the list to transition to the original screen.

The server apparatus 300 extracts, from image data obtained by capturing a screen of the electronic whiteboard 200, image data in an area surrounded by the stroke image whose attribute is the specific attribute. Further, the server apparatus 300 stores the extracted image data as important matter information.

Thus, according to the present embodiment, when the stroke image input to the electronic whiteboard 200 is to be displayed highlighted, the need for complicated operations for making the stroke image highlighted is removed. Accordingly, operability is improved. A detailed description of the predetermined instruction according to the present embodiment is provided below.

Further, the server apparatus 300 according to the present embodiment controls the electronic whiteboard 200 to display the important matter information, in response to receiving, from the electronic whiteboard 200, a request requesting a display of the important matter information.

In the present embodiment, by extracting and storing the content data or the important matter information, important matters that have been decided in a meeting are promptly presented to participants of the meeting at a desired timing such as during the meeting using the electronic whiteboard 200 or at the end of the meeting.

In other words, the server apparatus 300 according to the present embodiment provides an important matter extraction service that extracts important matter information included in the content data transmitted from the electronic whiteboard 200, and provides the electronic whiteboard 200 with the extracted important matter information.

Figure 2:
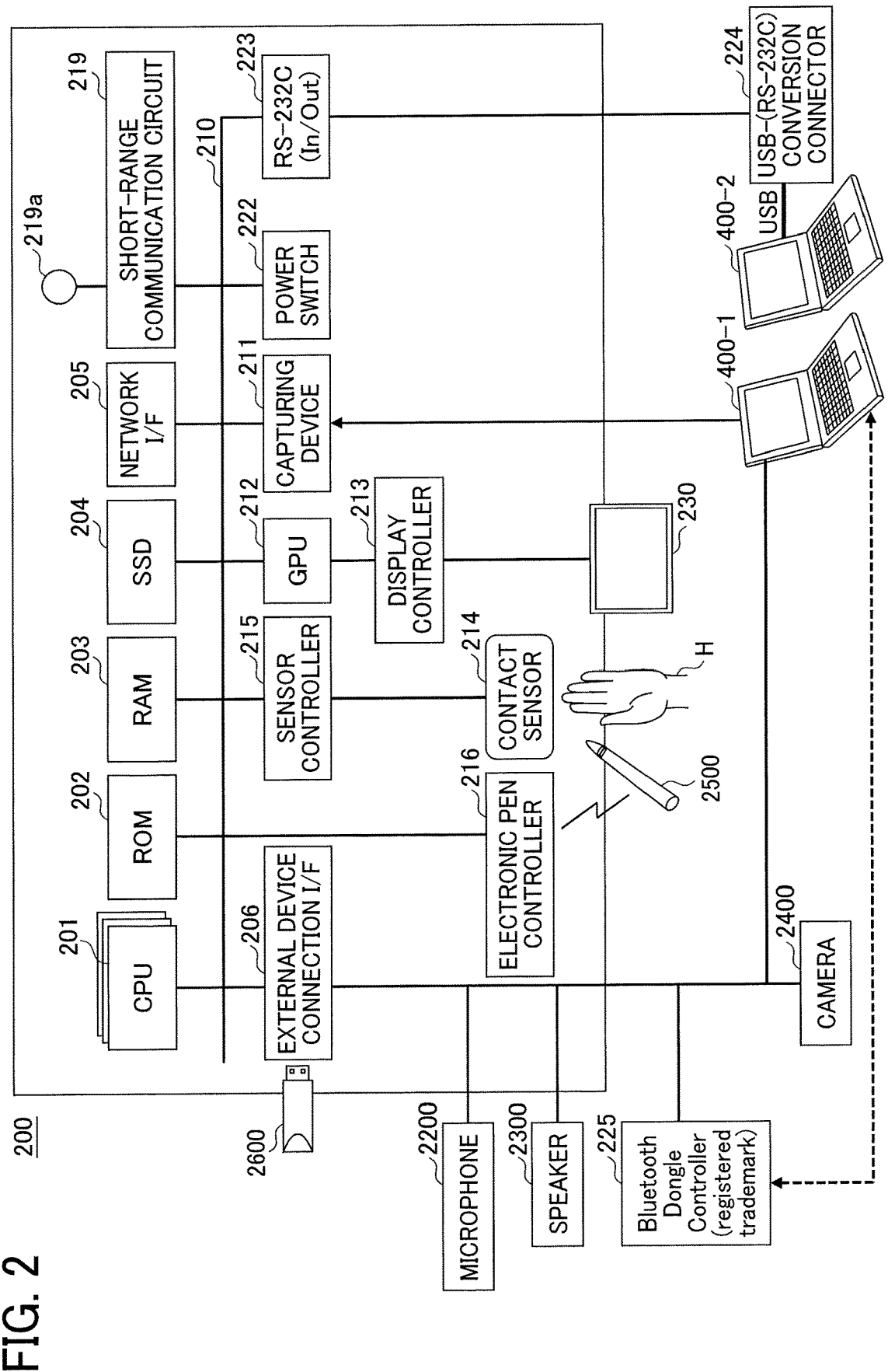
FIG. 2 is a block diagram illustrating an example of a hardware configuration of an electronic whiteboard, according to the first embodiment of the present disclosure.
Figure 3:
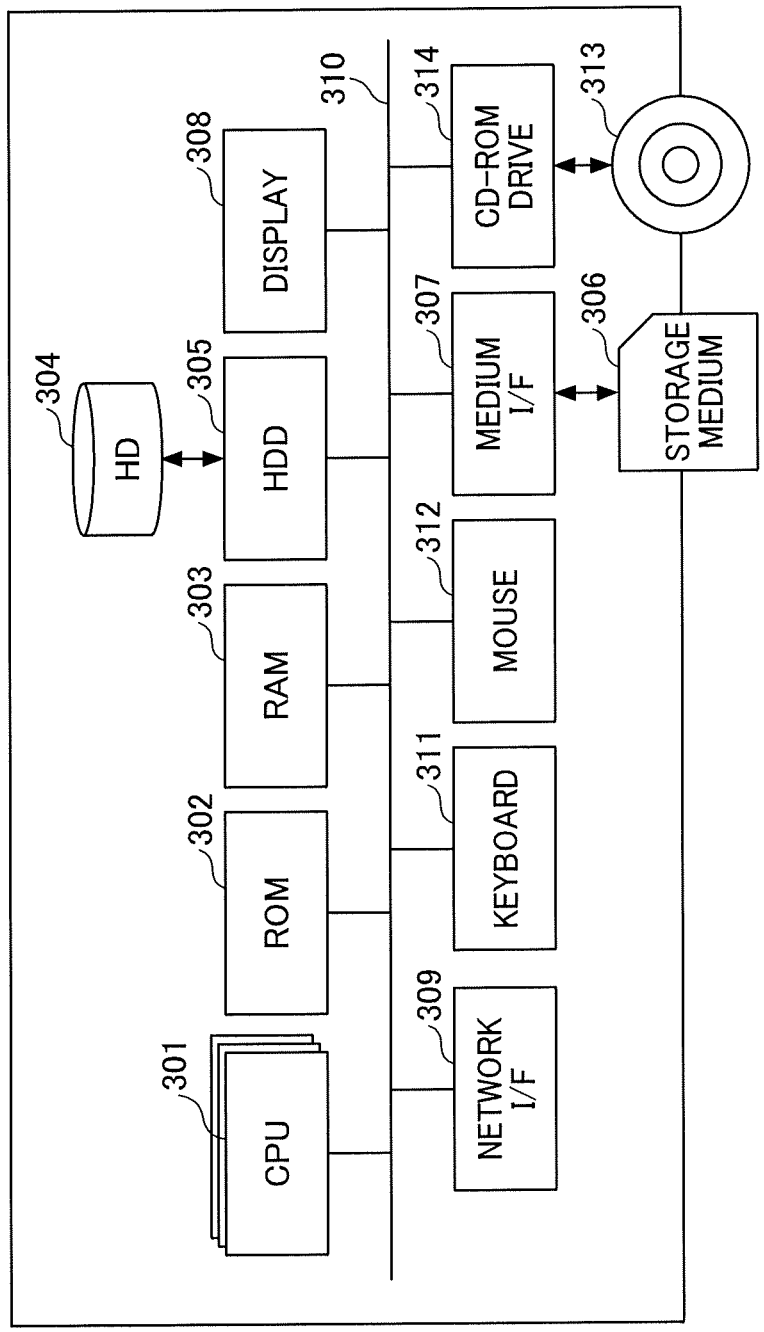
FIG. 3 is a block diagram illustrating an example of a hardware configuration of a server apparatus, according to the first embodiment of the present disclosure.

Hereinafter, a description is given of a hardware configuration of each apparatus included in the information processing system 100 according to the present embodiment with reference to FIGS. 2 and 3. FIG. 2 is a block diagram illustrating an example of a hardware configuration of the electronic whiteboard 200.

As illustrated in FIG. 2, the electronic whiteboard 200 is a terminal apparatus including a central processing unit (CPU) 201, a read only memory (ROM) 202, a random access memory (RAM) 203, a solid state drive (SSD) 204, a network interface (I/F) 205, and an external device connection interface (I/F) 206.

The CPU 201 controls entire operation of the electronic whiteboard 200. For example, the CPU 201 include a plurality of CPUs.

The ROM 202 stores programs such as an Initial Program Loader (IPL) to boot the CPU 201. The RAM 203 is used as a work area for the CPU 201. The SSD 204 stores various data such as a control program for the electronic whiteboard 200. The network I/F 205 controls communication with a communication network. The external device connection I/F 206 controls communication with a universal serial bus (USB) memory 2600, and external devices such as a camera 2400, a speaker 2300, a microphone 2200, etc.

The electronic whiteboard 200 further includes a capturing device 211, a graphics processing unit (GPU) 212, a display controller 213, a contact sensor 214, a sensor controller 215, an electronic pen controller 216, a short-range communication circuit 219, an antenna 219a for the short-range communication circuit 219, and a power switch 222.

The capturing device 211 causes a display of a personal computer (PC) 400-1 to display a still image or a moving image based on image data. The GPU 212 is a semiconductor chip dedicated to process a graphical image. The display controller 213 controls display of an image processed at the GPU 212 for output through a display 230, etc. The contact sensor 214 detects a touch onto the display 230 with an electronic pen 2500 or a user's hand H.

The sensor controller 215 controls operation of the contact sensor 214. The contact sensor 214 senses a touch input to a specific coordinate on the display 230 using the infrared blocking system. More specifically, the display 230 is provided with two light receivers/emitters disposed on both upper side ends of the display 230, and a reflector frame surrounding the sides of the display 230. The light receivers/emitters emit a plurality of infrared rays in parallel to a surface of the display 230. Light receiving elements receive lights passing in the direction that is the same as an optical path of the emitted infrared rays, which are reflected by the reflector frame. The contact sensor 214 outputs an identifier (ID) of the infrared ray that is blocked by an object after being emitted from the two light receiving elements, to the sensor controller 215. Based on the ID of the infrared ray, the sensor controller 215 detects a specific coordinate that is touched by the object.

The electronic pen controller 216 communicates with the electronic pen 2500 to detect a touch by the tip or bottom of the electronic pen 2500 to the display 230. The short-range communication circuit 219 is a communication circuit that communicates in compliance with the near field communication (NFC), the Bluetooth (registered trademark) and the like.

The power switch 222 is a switch that turns on or off the power of the electronic whiteboard 200.

The electronic whiteboard 200 further includes a bus line 210. The bus line 210 is an address bus or a data bus, which electrically connects the elements in FIG. 2 such as the CPU 201.

The electronic whiteboard 200 further includes an RS-232C port 223, a conversion connector 224, and a Bluetooth controller 225.

The RS-232C port 223 is connected to the bus line 210, and connects the PC 400-2 to the CPU 201, for example. The conversion connector 224 is a connector for connecting the electronic whiteboard 200 to a USB port of the PC 400-2.

The Bluetooth controller 225 is, for example, a controller to enable the electronic whiteboard 200 to communicate with the PC 400-1, etc., using the Bluetooth.

The contact sensor 214 is not limited to the infrared blocking system type. In another example, the contact sensor 214 is a different type of detector, such as a capacitance touch panel that identifies the contact position by detecting a change in capacitance, a resistance film touch panel that identifies the contact position by detecting a change in voltage of two opposed resistance films, or an electromagnetic induction touch panel that identifies the contact position by detecting electromagnetic induction caused by contact of an object to a display. In addition to or in alternative to detecting a touch by the tip or bottom of the electronic pen 2500, the electronic pen controller 216 may also detect a touch by another part of the electronic pen 2500, such as a part held by a hand of the user.

Hereinafter, a description is given of a hardware configuration of the server apparatus 300 according to the present embodiment, with reference to FIG. 3. FIG. 3 is a block diagram illustrating an example of a hardware configuration of the server apparatus 300.

The server apparatus 300 is constituted as a computer. As illustrated in FIG. 3, the server apparatus 300 is an information processing apparatus that includes a CPU 301, a ROM 302, a RAM 303, a hard disk (HD) 304, a hard disc drive (HDD) 305, a storage medium 306, a medium I/F 307, a display 308, a network I/F 309, a keyboard 311, a mouse 312, a compact-disc read only memory (CD-ROM) drive 314, and a bus line 310.

The CPU 301 controls an entire operation of the server apparatus 300. In the present embodiment, the CPU 301 may include a plurality of CPUs.

The ROM 302 stores programs such as n IPL to boot the CPU 301. The RAM 303 is used as a work area for the CPU 301. The HD 304 stores various data such as a control program. The HDD 305 controls reading and writing of data from and to the HD 304 under control of the CPU 301. The medium I/F 307 controls reading or writing (storing) of data with respect to the storage medium 306 such as a flash memory. The display 308 displays various information such as a cursor, menu, window, characters, or image. The network I/F 309 is an interface that controls communication of data through a communication network. The keyboard 311 is one example of input device provided with a plurality of keys for enabling a user to input characters, numerals, or various instructions. The mouse 312 is one example of input device for enabling a user to select a specific instruction or execution, select a target for processing, or move a cursor being displayed. The CD-ROM drive 314 reads or writes various data to or from a CD-ROM 313, which is an example of a removable storage medium.

The server apparatus 300 further includes a bus line 310. The bus line 310 is an address bus or a data bus, which electrically connects the elements in FIG. 3 such as the CPU 301.

Figure 4:
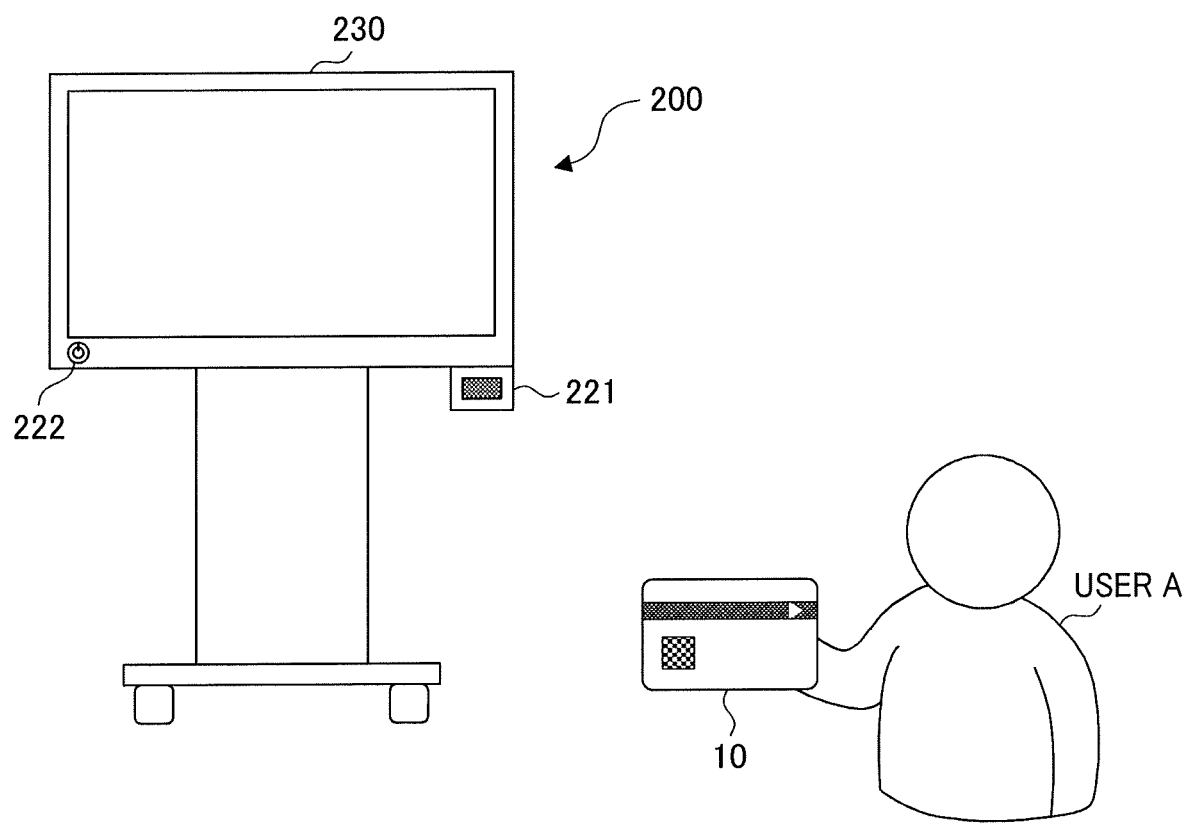
FIG. 4 is an illustration for explaining a use scenario of the electronic whiteboard, according to the first embodiment of the present disclosure.

Hereinafter, a description is given of a use scenario of the electronic whiteboard 200 according to the present embodiment, with reference to FIG. 4. FIG. 4 is an illustration for explaining a use scenario of the electronic whiteboard 200.

In this example, a user A uses the electronic whiteboard 200. When the user A presses the power switch 222, a display control unit 260, which is described below, controls the display 230 to display a login screen. Then, when the user A brings his or her integrated circuit (IC) card 10 close to the short-range communication circuit 219 of the electronic whiteboard 200, the electronic whiteboard 200 reads out identification information of the IC card 10 from the IC card 10. Then, the electronic whiteboard 200 transmits an authentication request for authenticating the user A to the server apparatus 300. This authentication request includes the identification information of the IC card 10. In response to receiving, from the server apparatus 300, a notification indicating that the user A is authenticated, the electronic whiteboard 200 stores, in the server apparatus 300, data input by the user A in association with the identification information of the IC card 10.

Figure 5:
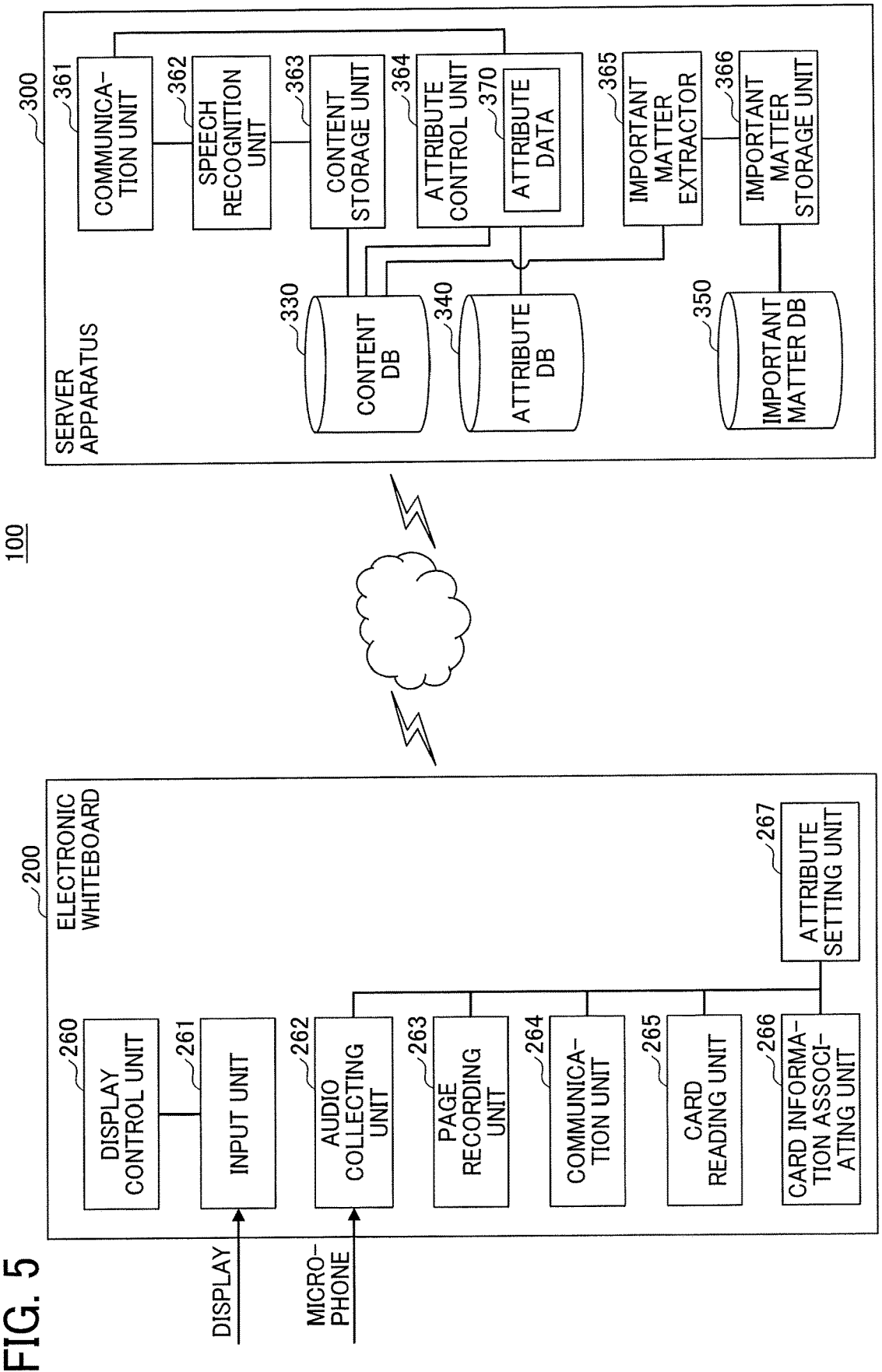
FIG. 5 is schematic diagram illustrating functions of each apparatus included in the information processing system, according to the first embodiment of the present disclosure.

Hereinafter, a description is given of functions of each apparatus included in the information processing system 100, with reference to FIG. 5. FIG. 5 is schematic diagram illustrating functions of each apparatus included in the information processing system 100, according to the first embodiment.

First, a description is given of functions of the electronic whiteboard 200. The functional units of the electronic whiteboard 200 described hereinafter are implemented by the one or more CPU (s) 201 of the electronic whiteboard 200 executing the program loaded from the ROM 202, etc.

The electronic whiteboard 200 according to the present embodiment includes a display control unit 260, an input unit 261, an audio collecting unit 262, a page recording unit 263, a communication unit 264, a card reading unit 265, a card information associating unit 266, and an attribute setting unit 267.

The display control unit 260 according to the present embodiment controls the display 230 to display an image or video that is output from a computer connected to the electronic whiteboard 200, various files that are input to the electronic whiteboard 200, and an image displayed on another electronic whiteboard 200 located at a remote place. Further, the display control unit 260 according to the present embodiment controls the display 230 to display a stroke image in accordance with attribute information received from the server apparatus 300.

The input unit 261 according to the present embodiment acquires image data of a stroke image representing characters and/or images drawn by a user on the display 230, and/or image data of an image displayed on a touch panel that the display 230 includes.

Further, the input unit 261 acquires moving image data captured by the camera 2400. In the present embodiment, image data includes moving image data. Further, the input unit 261 receives the predetermined instruction input to the electronic whiteboard 200.

The audio collecting unit 262 according to the present embodiment acquires, as audio data, sound that is input to the microphone 2200. Further, the audio collecting unit 262 acquires audio data that is input together with the video or image.

The page recording unit 263 according to the present embodiment records an image of the screen displayed on the display 230 and the stroke image received by the input unit 261 collectively as one piece of page data. In the present embodiment, image data includes page data. The page data recorded by the page recording unit 263 is transmitted, as a part of content data, to the server apparatus 300.

The communication unit 264 according to the present embodiment transmits, to the server apparatus 300, content data including the above-described various types of data received by the input unit 261 and the audio data acquired by the audio collecting unit 262. Further, when the input unit 261 receives the predetermined instruction, the communication unit 264 transmits, to the server apparatus 300, a notification indicating that the predetermined instruction is received. Further, the communication unit 264 receives the attribute information transmitted from the server apparatus 300.

When the IC card 10 is held over or near the antenna 219a, the card reading unit 265 according to the present embodiment reads identification information (card ID) recorded on the IC card 10. The card ID according to the present embodiment is, for example, card identification information identifying an owner of the IC card 10 (a user of the electronic whiteboard 200).

The card information associating unit 266 associates the card ID read by the card reading unit 265 with the content data. Specifically, the card information associating unit 266 can associate the content data acquired within a given time period after the card reading unit 265 reads the card ID with the card ID that is read by the card reading unit 265, for example.

Thus, in the present embodiment, a participant of a meeting only has to hold his or her own IC card 10 over or near the antenna 219a before speaking or writing letters or numbers, to have content data such as images or sounds be associated with the participant who has input the content data.

When transmitting the content data, the communication unit 264 according to the present embodiment transmits the content data together with the card ID associated with the content data to the server apparatus 300.

In response to receiving the predetermined instruction, the attribute setting unit 267 according to the present embodiment sets specific attribute information for a stroke image associated with the predetermined instruction.

In the present embodiment, the specific attribute information set for the stroke image associated with the predetermined instruction is also identification information indicating that the stroke image is an image designating an important matter.

In addition, the specific attribute information according to the present embodiment is set in advance by the attribute setting unit 267. A detailed description of the setting of the specific attribute information is provided below.

Next, a description is given of functions of the server apparatus 300 according to the present embodiment. The server apparatus 300 according to the present embodiment includes a content database 330, an attribute database 340, and an important matter database 350. FIG. 5 illustrates an example in which these databases are provided in the server apparatus 300. In another example, one or more of these databases may be provided in an external storage device outside the server apparatus 300.

The server apparatus 300 according to the present embodiment further includes a communication unit 361, a speech recognition unit 362, a content storage unit 363, an attribute control unit 364, an important matter extractor 365, and an important matter storage unit 366. Each functional unit of the server apparatus 300 according to the present embodiment is implemented by the one or more CPU 301 of the server apparatus 300 executing the program loaded from the ROM 302.

The content database 330 stores various types of data (contents) received from the electronic whiteboard 200. A content according to the present embodiment includes any one or any combination of audio data, image data, moving image data and stroke information. The attribute database 340 stores various types of attribute information that is to be set for a stroke image. The attribute information is information indicating a color of a stroke image and/or the thickness of a line, for example. The important matter database 350 stores important matter information extracted by the important matter extractor 365. A detailed description of each of these databases is provided below.

The communication unit 361 according to the present embodiment controls transmission of various types of information from the server apparatus 300 to an external apparatus. Specifically, the communication unit 361 transmits a list of the attribute information stored in the attribute database 340 to the electronic whiteboard 200.

The speech recognition unit 362 according to the present embodiment converts audio data included in the content data into text data using speech recognition capability. The speech recognition capability of the speech recognition unit 362 can be implemented by artificial intelligence, for example.

When the communication unit 361 receives content data, the content storage unit 363 according to the present embodiment stores the received content data in the content database 330.

The attribute control unit 364 stores attribute data 370. When the communication unit 361 receives, from the electronic whiteboard 200, a notification indicating that the predetermined instruction is received, the attribute control unit 364 reads out the attribute data 370 and sends the read-out attribute data to the communication unit 361. In other words, in response to receiving the predetermined instruction at the electronic whiteboard 200, the attribute control unit 364 changes attribute information of a stroke image associated with the predetermined instruction to attribute information indicated by the attribute data 370.

The attribute data 370 according to the present embodiment is specific attribute information to be set for a stroke image associated with the predetermined instruction. The attribute data 370 functions as identification information indicating important matter information to be extracted by the important matter extractor 365. In other words, the attribute data 370 is identification information for having information in an area specified by a stroke image be identified as important matter information (information to be extracted).

Further, in response to receiving, from the electronic whiteboard 200, a request for setting the attribute data 370, the attribute control unit 364 according to the present embodiment controls the display 230 of the electronic whiteboard 200 to display a list of the attribute information stored in the attribute database 340. Furthermore, the attribute control unit 364 holds the attribute information selected at the electronic whiteboard 200 as the attribute data 370.

The important matter extractor 365 refers to the content database 330 to extract important matter information from the content data. More specifically, the important matter extractor 365 extracts, as important matter information, image data in an area surrounded by a stroke image for which the attribute data 370 is set, from page data included in the content data.

Therefore, in the present embodiment, a content indicated by the image data (information) in the area specified by the stroke image for which the attribute data 370 is set in the page data is identified as an important matter. Further, the important matter information according to the present embodiment is image data (information) in the area specified by the stroke image for which the attribute data 370 is set.

The important matter storage unit 366 stores, in the important matter database 350, the important matter information extracted by the important matter extractor 365. When storing the important matter information, the important matter storage unit 366 according to the present embodiment can store the important matter information in association with a date and time at which the content data from which the important matter information is extracted is acquired and/or in association with a name of a meeting corresponding to the content data, for example.

Hereinafter, a description is given of each database that the server apparatus 300 according to the present embodiment, with reference to FIG. 6 to FIG. 8. FIG. 6 is a diagram illustrating an example the content database 330, according to the first embodiment.

The content database 330 according to the present embodiment includes a conference ID, a date, a card ID, a time, and content data, each being an item of information.

A value of the item "meeting ID" is identification information for identifying a meeting being held using the electronic whiteboard 200. A value of the item "date" indicates a date on which a meeting identified by the associated meeting ID is held. A value of the item "card ID" indicates card identification information stored in the IC card. A value of the item "time" indicates a time at which associated content data is acquired. A value of the item "content data" is content data received from the electronic whiteboard 200.

The example of FIG. 6 indicates that the electronic whiteboard 200 acquires "AudioData01.mpg" associated with the card ID "100", at 10:00 in a meeting whose meeting ID is "001", held on Feb. 10, 2017. Further, the electronic whiteboard 200 acquires "PageData01.jpg" that is associated with the card ID "100", at 10:01. Furthermore, the electronic whiteboard 200 acquires "StrokeImageData01.jpg" that is associated with the card ID "100", at 10:03.

In another example, the content database 330 can store, as content data, text data obtained by converting audio data by the speech recognition unit 362. In still another example, the content database 330 stores, as content data, stroke information that forms an image indicated by drawing data.

In still another example, the content database 330 includes a meeting name associated with the meeting ID.

FIG. 7 is a diagram illustrating an example of the attribute database 340, according to the first embodiment. The attribute database 340 according to the present embodiment includes, as items of data, a line type, a line color, and a line width, which are associated with each other. A "line" in the attribute database 340 illustrated in FIG. 7 includes a straight line and a curved line, indicating an image of one stroke, which is a stroke image. In other words, in the present embodiment, a term "line" and a term "stroke image" are interchangeable terms.

The item "line type" indicates a type of a line. The item "line color" indicates a color of a line. The item "line width" indicates a thickness of a line.

The example of FIG. 7 indicates that there are line types such as a solid line, a dotted line 1, or a dotted line 2. Further, the example of FIG. 7 indicates that there are line colors such as red, orange, or yellow. Furthermore, the example of FIG. 7 indicates that there are line widths such as xx mm or yy mm.

In the following description, information including the items that the attribute database 340 includes and values of the items is referred to as attribute information.

Hereinafter, a description is given of setting of the attribute data 370, according to the present embodiment. In the information processing system 100 according to the present embodiment, when the electronic whiteboard 200 receives a request for setting the attribute information of a stroke image, the electronic whiteboard 200 transmits this setting request to the server apparatus 300. In response to receiving the setting request, the attribute control unit 364 of the server apparatus 300 controls the electronic whiteboard 200 to display a screen that enables selection of particular attribute information from the attribute information stored in the attribute database 340.

The screen that enables selection of the particular attribute information is, for example, a screen that enables a user to set, for each of the items that the attribute database 340 includes, a particular value of the item.

When a particular value is selected for each of the items "line type", "line color", "line width" on the screen displayed on the display 230, the attribute setting unit 267 of the electronic whiteboard 200 transmits, to the server apparatus 300, a notification indicating the particular value selected for each of the items.

In response to receiving this notification, the attribute control unit 364 of the server apparatus 300 stores, as the attribute data 370, the particular value selected for each of the items. Therefore, the attribute data 370 according to the present embodiment is information indicating a line type, a line color, and a line width used when rendering a stroke image. For example, when the dotted line 1 is selected as a value of the item "line type", orange is selected as a value of the item "line color", and 0.8 mm is selected as a value of the item "line width" at the electronic whiteboard 200, the attribute data 370 is "dotted line 1, orange, 0.8 mm".

FIG. 8 is a diagram illustrating an example of the important matter database 350, according to the first embodiment. The important matter database 350 according to the present embodiment includes, as items of data, a meeting ID, a date, an important matter, and page data, which are associated with each other. In the following description, information including the values of the items "meeting ID", "date", "card ID", "important matter", and "page data" in the important matter database 350 is referred to as important matter information.

The item "date" indicates a date on which content data including the associated "important matter" is acquired. A value of the item "important matter" indicates an important matter extracted from the content data. A value of the item "page data" indicates image data of the important matter extracted as an important matter.

In another example, the important matter database 350 can include, as an item of data, a time when the content data is acquired. Further, in still another example, the important matter information according to the present embodiment does not necessarily have to include the value for the item "page data". The important matter information will suffice, provided that it includes, at least, the value for the item "meeting ID" and the value for the item "important matter".

The example of FIG. 8 indicates "ImageData11.jpg" associated with the card ID "100" is extracted as an important matter, at a meeting whose meeting ID is "001", held on Feb. 10, 2017.

The server apparatus 300 according to the present embodiment can have an optical character recognition (OCR) capability, and can perform character recognition on an image indicated by image data extracted as the important matter information. In that case, the server apparatus 300 can include, in the important matter information, text data obtained by performing character recognition on the image data. In the present embodiment, an important matter can be stored as text data by performing the character recognition process as described above.

In the above description, the information processing system 100 includes one server apparatus 300. In another example, the information processing system 100 includes a plurality of server apparatuses 300. In this case, the above-described functions and databases can be distributed over the plurality of server apparatuses 300. Furthermore, the information processing system 100 having a system configuration in which the electronic whiteboard 200 is communicably connected to the server apparatus 300 is just an example. The information processing system 100 can have various types of system configuration depending on applications or purposes.

Figure 9:
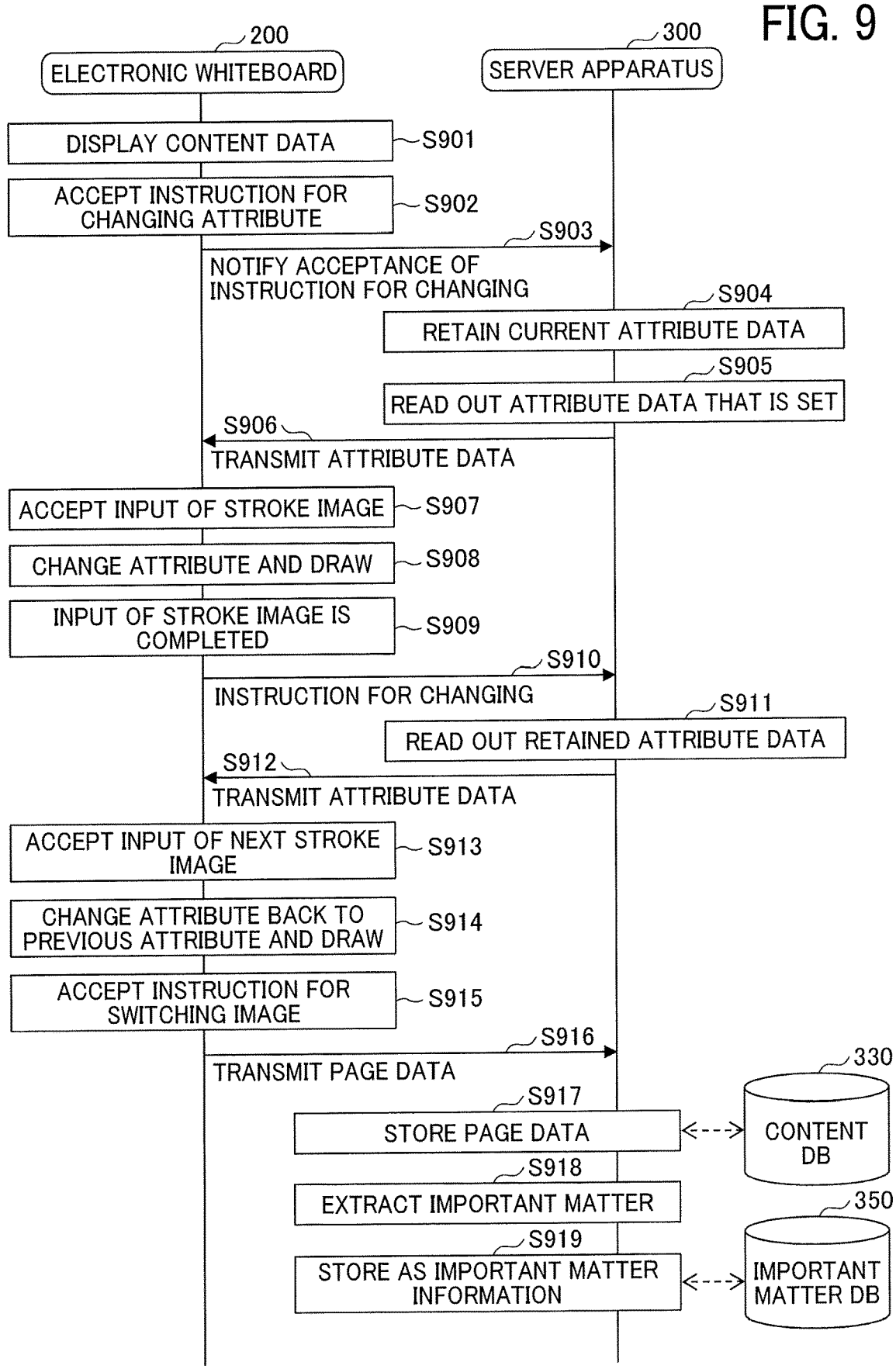
FIG. 9 is a sequence diagram illustrating an operation performed by the information processing system, according to the first embodiment of the present disclosure.

Hereinafter, a description is given of steps in an operation performed by the information processing system 100 according to the present embodiment, with reference to FIG. 9. FIG. 9 is a sequence diagram illustrating an operation performed by the electronic whiteboard 200 and the server apparatus 300, according to the first embodiment.

In the present embodiment, an operation of tapping a specific position on the display 230 of the electronic whiteboard 200 is received as the predetermined instruction. A stroke image drawn immediately after receiving the predetermined instruction is displayed with attribute information indicated by the attribute data 370. In other words, in the present embodiment, a stroke image associated with the predetermined instruction is a stroke image that is input immediately after the predetermined instruction.

In the information processing system 100 according to the present embodiment, the display control unit 260 of the electronic whiteboard 200 controls the display 230 to display content data (step S901). Next, the input unit 261 of the electronic whiteboard 200 receives an input of an instruction to change an attribute of a stroke image input by handwriting entry (step S902). In other words, the input unit 261 of the electronic whiteboard 200 receives the predetermined instruction, which is an operation of tapping the specific position on the display 230. The stroke image according to the present embodiment is input by, for example, the electronic pen 2500 or a user's hand H.

When the input unit 261 of the electronic whiteboard 200 receives the predetermined instruction, the communication unit 264 transmits, to the server apparatus 300, a notification indicating that the predetermined instruction is received (step S903). In this step, the electronic whiteboard 200 also transmits, to the server apparatus 300, current attribute information that is set for the stroke image together with the notification.

When the server apparatus 300 receives the notification at the communication unit 361, the attribute control unit 364 holds the attribute information received together with the notification (step S904). Next, the attribute control unit 364 of the server apparatus 300 reads out the attribute data 370 (step S905). Subsequently, the communication unit 361 of the server apparatus 300 transmits the read-out attribute data 370 to the electronic whiteboard 200 (step S906).

Next, when the input unit 261 of the electronic whiteboard 200 receives an input of a stroke image (step S907), the display control unit 260 draws the input stroke image as a stroke image whose attribute information is the specific attribute information indicated by the attribute data 370 (step S908).

Subsequently, when the input of the stroke image is completed (step S909), the electronic whiteboard 200 transmits an instruction to change the attribute information of the stroke image to the server apparatus 300 (step S910). In the present embodiment, the electronic whiteboard 200 can determine that the input of the stroke image is completed in response to detection of elapse of a predetermined time since the electronic pen 2500 or the hand H was made apart from the display 230.

When the communication unit 361 receives the instruction to change the attribute information, the server apparatus 300 reads out the attribute information that is held in step S904 (step S911). Further, the communication unit 361 transmits the read-out attribute information to the electronic whiteboard 200 (step S912).

When the input unit 261 receives a next input of a stroke image after step S912 (step S913), the display control unit 260 of the electronic whiteboard 200 draws the input stroke image as an image whose attribute information is the attribute information received in step S913 (step S914). As described above, the information processing system 100 according to the present embodiment changes attribute information of a stroke image to attribute information indicated by the attribute data 370, immediately after receiving the predetermined instruction. Further, as described above, when an input of the stroke image whose attribute information is the attribute information indicated by the attribute data 370 is completed, the information processing system 100 restores the previous attribute information, for a next stroke image.

Next, for example, when the input unit 261 of the electronic whiteboard 200 receives an instruction to switch an image displayed on the display 230 (step S915), the page recording unit 263 transmits page data to the server apparatus 300 (step S916). In this step, the electronic whiteboard 200 can transmit, together with the page data, a meeting ID, a date, a card ID associated with the page data, and a time, to the server apparatus 300.

In response to receiving the page data, the content storage unit 363 of the server apparatus 300 stores the received page data in the content database 330 in association with the meeting ID, the date, the associated card ID, and the time (step S917).

Next, the important matter extractor 365 of the server apparatus 300 extracts, from the received page data, important matter information, which is an image of the area surrounded by the stroke image for which the attribute data 370 is set (step S918).

Subsequently, the important matter storage unit 366 of the server apparatus 300 stores the extracted important matter information in the important matter database 350 (step S919).

A description is given heretofore, with reference to FIG. 9, an example in which important matter information is extracted each time an instruction to switch an image to be displayed on the display 230 of the electronic whiteboard 200 is received. In another example of the present embodiment, important matter information is extracted for each of a plurality pieces of received page data after a meeting.

A detailed description is given hereinafter of an operation performed by the information processing system 100 according to the present embodiment, with reference to FIGS. 10A, 10B and 10C.

Figure 10A:
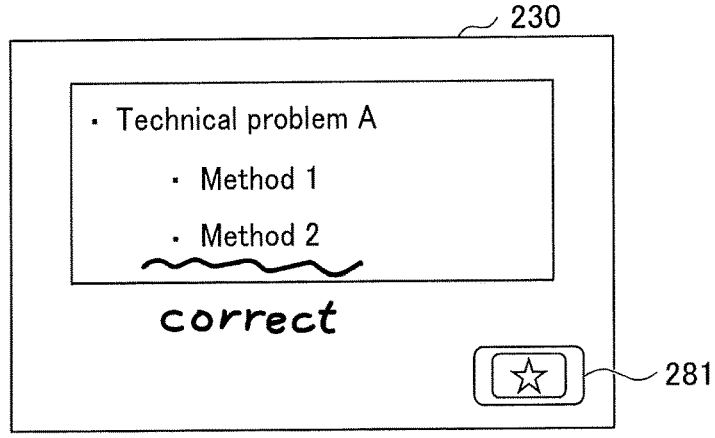
FIGS. 10A, 10B, and 10C are illustrations for explaining a predetermined instruction, according to the first embodiment of the present disclosure.
Figure 10B:
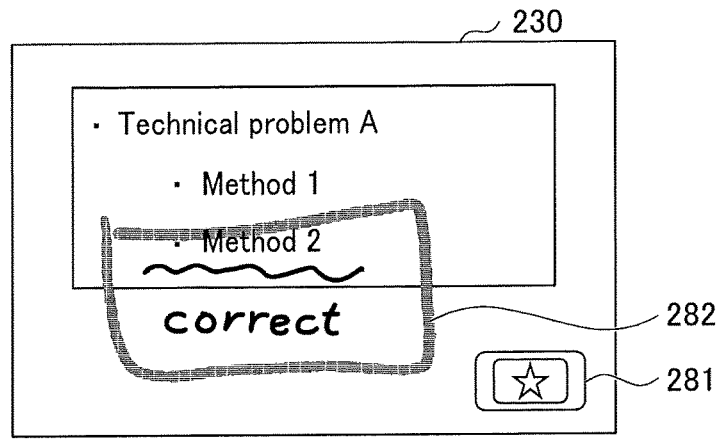
Figure 10C:
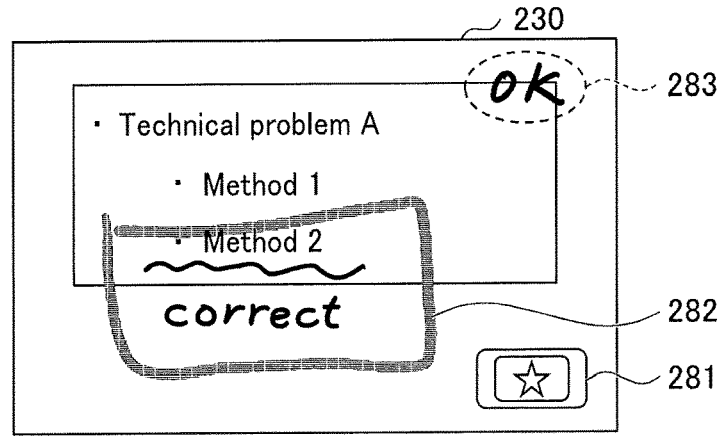

FIGS. 10A, 10B, and 10C are illustrations for explaining the predetermined instruction, according to the first embodiment. FIG. 10A is an illustration of a display example on the display 230 before receiving the predetermined instruction. FIG. 10B is an illustration of a display example on the display 230 after receiving the predetermined instruction. FIG. 10C is another illustration of a display example on the display 230 after receiving the predetermined instruction.

As illustrated in FIG. 10A, an instruction button 281 is displayed on the display 230. When the instruction button 281 is tapped on the display 230, the electronic whiteboard 200 according to the present embodiment transmits, to the server apparatus 300, a notification indicating that a predetermined instruction is received. In response to receiving this notification, the server apparatus 300 transmits the attribute data 370 to the electronic whiteboard 200.

In response to receiving the attribute data 370, the electronic whiteboard 200 renders a stroke image 282 that is input after the instruction button 281 is tapped in accordance with attribute information indicated by the attribute data 370, as illustrated in FIG. 10B. In the example of FIG. 10B, the line color and line width of the stroke image 282 are different from those of other images displayed on the display 230.

In the present embodiment, as described above, by drawing the stroke image 282 according to the attribute data 370 indicating an important matter, an area to be extracted as important matter information from page data displayed on the display 230 is determined.

Further, when the input of the stroke image 282 is completed, the electronic whiteboard 200 transmits, to the server apparatus 300, a notification indicating that the input is completed. In response to receiving this notification, the server apparatus 300 transmits, to the electronic whiteboard 200, the previous attribute information that was set to a stroke image before the instruction button 281 is tapped.

As illustrated in FIG. 10C, when a stroke image 283 is input after the input of the stroke image 282 is completed, the electronic whiteboard 200 renders the stroke image 283 in accordance with the previous attribute information that was set before the instruction button 281 is tapped.

Figure 11:
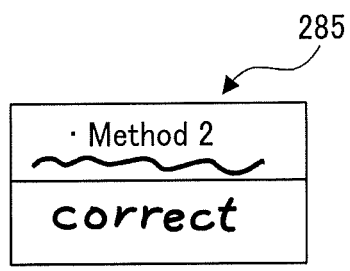
FIG. 11 is an illustration for explaining important matter information, according to the first embodiment of the present disclosure.

Hereinafter, a description is given of important matter information according to the present embodiment, with reference to FIG. 11. FIG. 11 is an illustration for explaining important matter information, according to the first embodiment.

FIG. 11 illustrates an example of important matter information that is extracted from page data, when the electronic whiteboard 200 receives an instruction for switching an image in a state of FIG. 10C, and accordingly an image of the screen illustrated in FIG. 10C is stored as page data in the server apparatus 300.

The important matter extractor 365 of the server apparatus 300 according to the present embodiment extracts, as important matter information, image data of an image 285 of an area surrounded by the stroke image 282 drawn in accordance the attribute data 370 in the page data.

As described above, according to the present embodiment, in response to receiving the predetermined instruction, the information processing system 100 assigns identification information indicating an important matter to a stroke image associated with the predetermined instruction. Therefore, according to the present embodiment, in page data, an area surrounded by the stroke image associated with the predetermined instruction can be extracted as important matter information.

More specifically, according to the present embodiment, in response to receiving an operation of tapping a specific position on the display 230, the information processing system 100 assigns identification information indicating an important matter to a stroke image inputted immediately after the tapping of the specific position. Therefore, according to the present embodiment, an area surrounded by a stroke image that is input after the tapping of the specific position is extracted as important matter information.

Further, according to the present embodiment, when an input of a stroke image of one stroke is completed, the attribute information is changed to the previous attribute information. Accordingly, an operation of restoring the previous attribute information can be omitted.

As described heretofore, according to the present embodiment, when a user is to specify important matter information on the display 230, the user is saved from complicated operations to display indications indicating an important matter. Accordingly, operability is improved when specifying an important matter to be extracted.

In the present embodiment, a description is given heretofore of an example in which the stroke image associated with the predetermined instruction is a stroke image that is input immediately after the predetermined instruction is received.

In another example, the stroke image associated with the predetermined instruction is a stroke image input within a specific period of time after receiving the predetermined instruction. In still another example, the stroke image associated with the predetermined instruction includes stroke images corresponding to a predetermined number of strokes that are input after receiving the predetermined instruction. In still another example, the stroke image associated with the predetermined instruction includes stroke images that are input before and after receiving the predetermined instruction. In other words, in the present embodiment, attribute information of one or more stroke images inputted within a specific period of time that is set with respect to a timing when the predetermined instruction is received can be set to the specific attribute information indicated by the attribute data 370.

A user of the information processing system 100 can configure desired settings as to which stroke image is to be a stroke image associated with the predetermined instruction.

Second Embodiment

Hereinafter, a description is given of a second embodiment of the present disclosure, with reference to drawings. The second embodiment is different from the first embodiment in how the predetermined instruction is input at the electronic whiteboard 200. Therefore, the description of the second embodiment is given of the differences from the first embodiment. The same reference numerals are given to the same or corresponding functions or configurations as those of the first embodiment, and redundant descriptions thereof are omitted or simplified appropriately.

Figure 12:
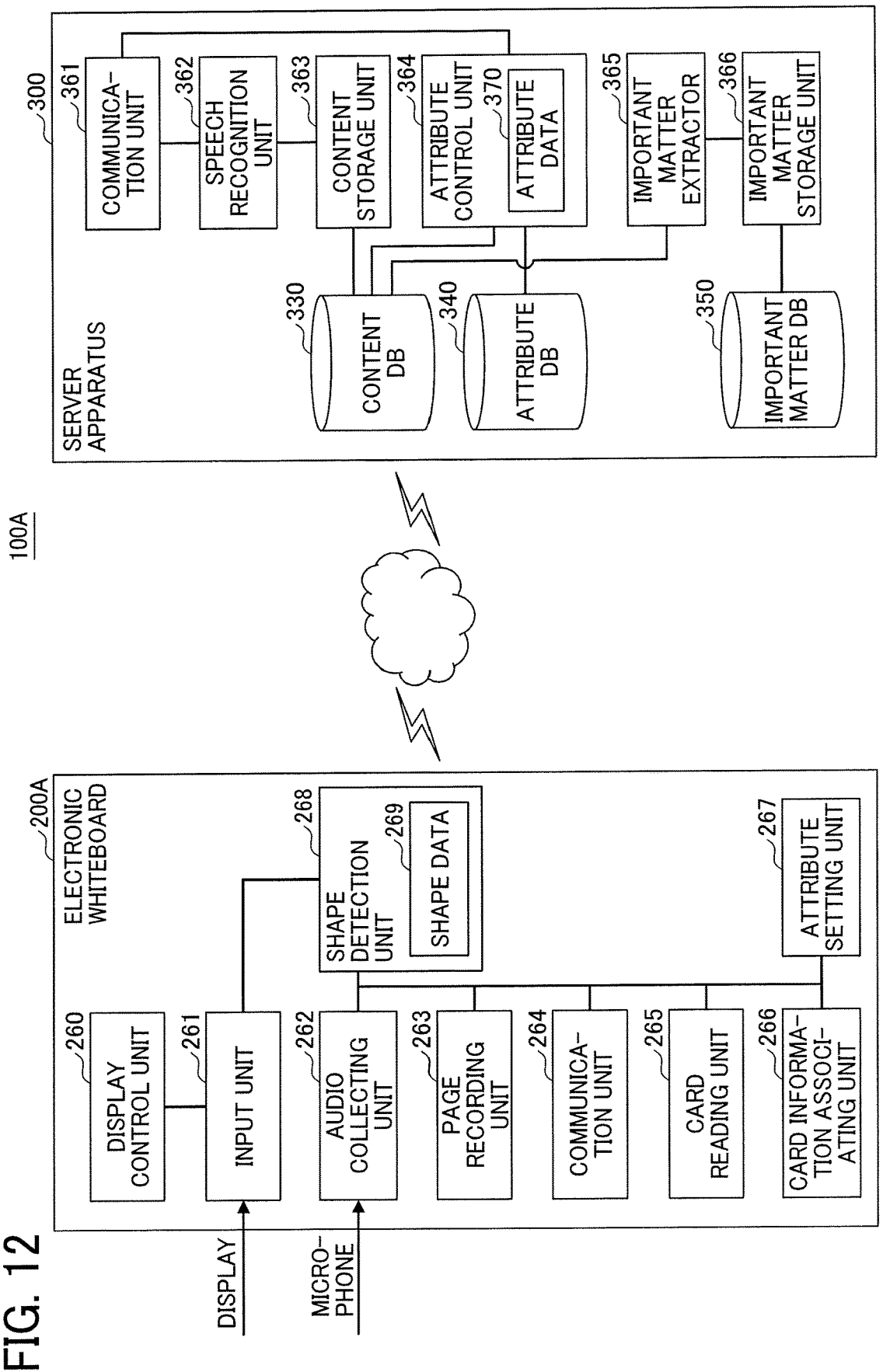
FIG. 12 is schematic diagram illustrating functions of each apparatus included in the information processing system, according to a second embodiment of the present disclosure.

FIG. 12 is schematic diagram illustrating functions of each apparatus included in the information processing system 100, according to the second embodiment.

The information processing system 100A according to the present embodiment includes an electronic whiteboard 200A and the server apparatus 300.

The electronic whiteboard 200A according to the present embodiment includes the display control unit 260, the input unit 261, the audio collecting unit 262, the page recording unit 263, the communication unit 264, the card reading unit 265, the card information associating unit 266, the attribute setting unit 267, and a shape detection unit 268.

The shape detection unit 268 according to the present embodiment stores shape data 269, and detects a stroke image having a shape indicated by the shape data 269.

Further, when the shape detection unit 268 detects the stroke image having the shape indicated by the shape data 269, the communication unit 264 transmits, to the server apparatus 300, a notification indicating that the predetermined instruction is received.

In other words, in the present embodiment, the detection of the stroke image having a shape indicated by the shape data 269 is received as the predetermined instruction. In the present embodiment, a stroke image input immediately before accepting the predetermined instruction is determined as a stroke image associated with the predetermined instruction, and accordingly attribute information of this stroke image is set to the attribute information indicated by the attribute data 370.

A shape indicated by the shape data 269 according to the present embodiment may be any suitable shape, preferably a shape that can be drawn by one stroke. Examples of the shape indicated by the shape data include a rectangle or a circle. In another example, the shape data 269 according to the present embodiment is stored as an image indicating a specific shape, or stored as coordinate information of a group of points indicating a specific shape.

In still another example, the shape data 269 according to the present embodiment may be information of a result of learning obtained by machine learning, for example. In this case, the shape detection unit 268 can update the shape data 269 by machine learning based on an extraction result, each time important matter information is extracted from content data based on image data of images (marks or figures) that are stored in advance as an important matter.

Hereinafter, a description is given of steps in an operation performed by the information processing system 100A according to the present embodiment, with reference to FIG. 13.

Figure 13:
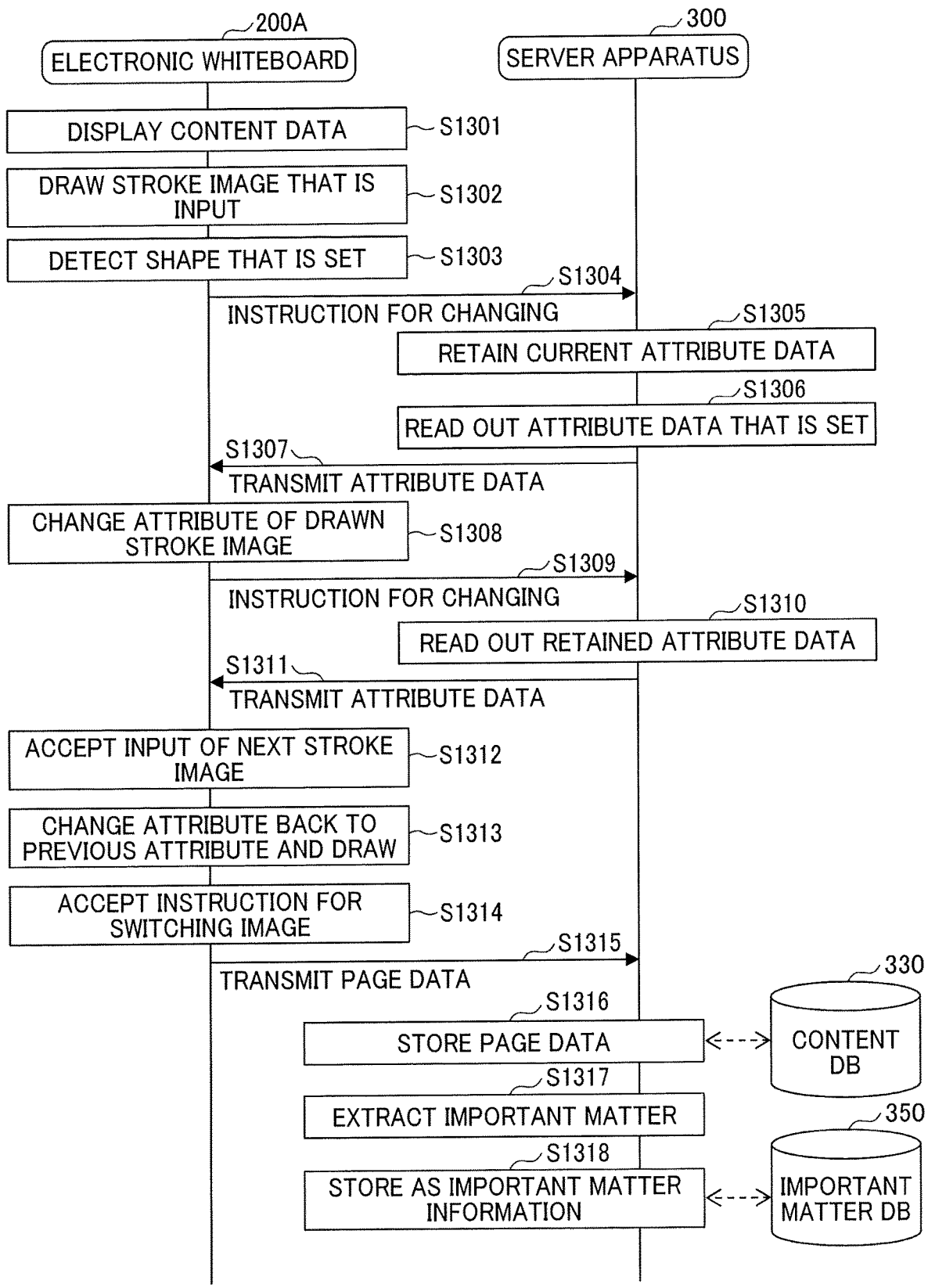
FIG. 13 is a sequence diagram illustrating an operation performed by the information processing system, according to the second embodiment of the present disclosure.

FIG. 13 is a sequence diagram illustrating an operation performed by the information processing system 100A, according to the second embodiment.

In the information processing system 100A according to the present embodiment, the display control unit 260 of the electronic whiteboard 200A controls the display 230 to display content data (step S1301). Next, the input unit 261 of the electronic whiteboard 200A draws an input stroke image (step S1302).

Subsequently, the shape detection unit 268 of the electronic whiteboard 200A detects a stroke image matching the shape data 269 (step S1303). In this step, the stroke image detected by the shape detection unit 268 does not necessarily have to have a shape that completely matches the shape data 269. In other words, the shape detection unit 268 can detect an image having a similar shape to a shape indicated by the shape data 269.

When the stroke image having a shape matching the shape data 269 is input, the electronic whiteboard 200A transmits, to the server apparatus 300, a notification indicating that the predetermined instruction is received (step S1304). In other words, the electronic whiteboard 200A transmits, to the server apparatus 300, an instruction for changing attribute information of the stroke image.

FIG. 13 illustrates an example operation performed when a stroke image detected by the shape detection unit 268 exists. In another example in which an instruction for changing an image is input before the shape detection unit 268 detects an image having a shape matching a shape indicated by the shape data 269, the operation proceeds to step S1315, described below.

Further, in the present embodiment, for example, in response to receiving the instruction to change the attribute information in step S1304, the server apparatus 300 can transmit, to the electronic whiteboard 200A, an inquiry as to whether image data in an area indicated by the stroke image detected by the shape detection unit 268 is important matter information.

In this case, the server apparatus 300 can determine whether to transmit the attribute data 370 to the electronic whiteboard 200A, based on a response to the inquiry from the electronic whiteboard 200A. Specifically, when the response transmitted from the electronic whiteboard 200A to the inquiry indicates that the image data in an area indicated by the stroke image detected by the shape detection unit 268 is important matter information, the server apparatus 300 transmits the attribute data 370 to the electronic whiteboard 200A.

According to the present embodiment, by transmitting the attribute data 370 to the electronic whiteboard 200A as described above, accuracy of extraction of important matter information based on the detection result by the shape detection unit 268 is improved.

Since processes of S1304 to S1307 of FIG. 13 are performed in substantially the similar manner as described above referring to S903 to S906 of FIG. 9, the redundant description thereof is omitted.

In response to receiving the attribute data 370, the electronic whiteboard 200A changes the attribute information of the stroke image detected by the shape detection unit 268 to attribute information indicated by the attribute data 370 (step S1308). In other words, the electronic whiteboard 200A changes the attribute information of the stroke image inputted immediately before receiving the predetermined instruction to the attribute information indicated by the attribute data 370.

Next, the electronic whiteboard 200A transmits, to the server apparatus 300, an instruction for changing attribute information (step S1309).

Since processes of S1309 to S1318 of FIG. 13 are performed in substantially the similar manner as described above referring to S910 to S919 of FIG. 9, the redundant description thereof is omitted.

Hereinafter, a further description is given of an operation performed by the information processing system 100A according to the present embodiment, with reference to FIGS. 14A, 14B, and 14C.

Figure 14A:
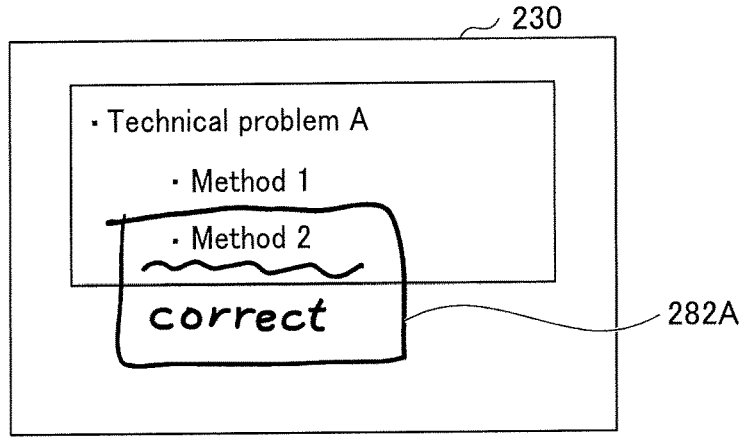
FIGS. 14A, 14B, and 14C are illustrations for explaining the predetermined instruction, according to the second embodiment of the present disclosure.
Figure 14B:
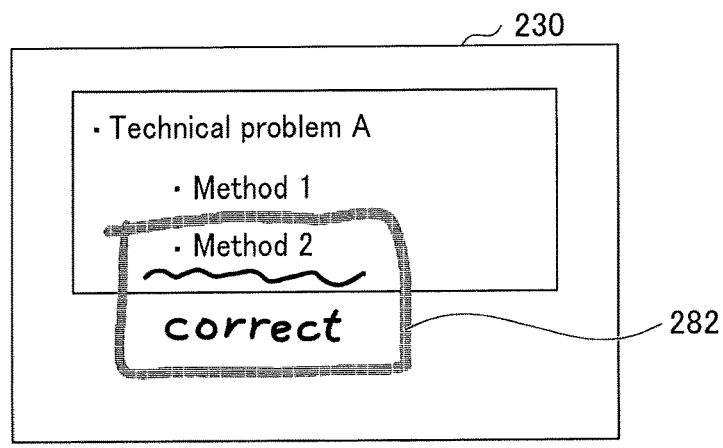
Figure 14C:
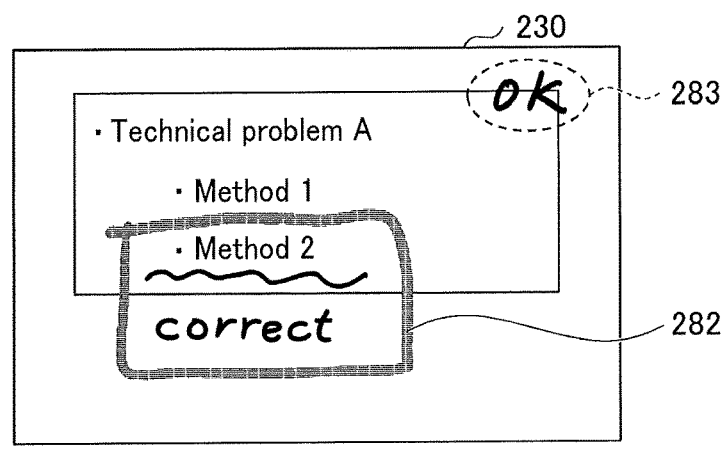

FIGS. 14A, 14B, and 14C are illustrations for explaining the predetermined instruction, according to the second embodiment. FIG. 14A is an illustration of a display example on the display 230 before receiving the predetermined instruction. FIG. 14B is an illustration of a display example on the display 230 after receiving the predetermined instruction. FIG. 14C is another illustration of a display example on the display 230 after receiving the predetermined instruction. In FIGS. 14A to 14C, a shape indicated by the shape data 269 is a rectangle.

FIG. 14A illustrates a state in which a stroke image 282A is input and displayed on the display 230. When the electronic whiteboard 200A according to the present embodiment detects that the input stroke image 282A has a shape matching the shape data 269, the electronic whiteboard 200A transmits, to the server apparatus 300, a notification indicating that the predetermined instruction is received.

In response to receiving this notification, the server apparatus 300 transmits the attribute data 370 to the electronic whiteboard 200A. In response to receiving the attribute data 370, the electronic whiteboard 200A changes the attribute information of the stroke image 282A to attribute information indicated by the attribute data 370.

As a result, the stroke image 282A is changed to the stroke image 282 as illustrated in FIG. 14B.

Further, after changing the attribute information of the stroke image 282A, the electronic whiteboard 200A transmits, to the server apparatus 300, a notification indicating that the change of the attribute information is completed. In other words, the electronic whiteboard 200A transmits, to the server apparatus 300, an instruction for restoring the previous attribute information.

In response to receiving this notification, the server apparatus 300 transmits the attribute information that is stored in the state of FIG. 14A to the electronic whiteboard 200A.

Next, a stroke image 283 as illustrated in FIG. 14C is input. A shape of the stroke image 283 does not match a shape indicated by the shape data 269. Accordingly, the stroke image 283 is rendered with the same attribute information as the stroke image 282 illustrated in FIG. 14A.

As described above, according to the present embodiment, only by surrounding a specific area with a stroke image having a preset shape, identification information (the attribute data 370) indicating an important matter is added to this stroke image. Thus, the specific area surrounded by this stroke image is extracted as important matter information.

Therefore, according to the present embodiment, when a user is to specify important matter information on the display 230, the need for complicated operations for displaying indications indicating an important matter is removed. Accordingly, operability is improved when specifying an important matter to be extracted.

In the present embodiment, a description is given heretofore of an example in which the stroke image associated with the predetermined instruction is a stroke image that is input immediately before the predetermined instruction is received. In another example, the stroke image associated with the predetermined instruction is a stroke image input within a predetermined period of time after receiving the predetermined instruction. In still another example, the stroke image associated with the predetermined instruction includes stroke images corresponding to a predetermined number of strokes that are input before receiving the predetermined instruction. In still another example, the stroke image associated with the predetermined instruction includes stroke images that are input before and after receiving the predetermined instruction. A user of the information processing system 100A can configure desired settings as to which stroke image is to be a stroke image associated with the predetermined instruction.

Third Embodiment

Hereinafter, a description is given of a third embodiment of the present disclosure, with reference drawings. The third embodiment is different from the first embodiment in that the electronic whiteboard stores attribute data. Therefore, the description of the third embodiment is given of the differences from the first embodiment. The same reference numerals are given to the same or corresponding functions or configurations as those of the first embodiment, and redundant descriptions thereof are omitted or simplified appropriately.

Figure 15:
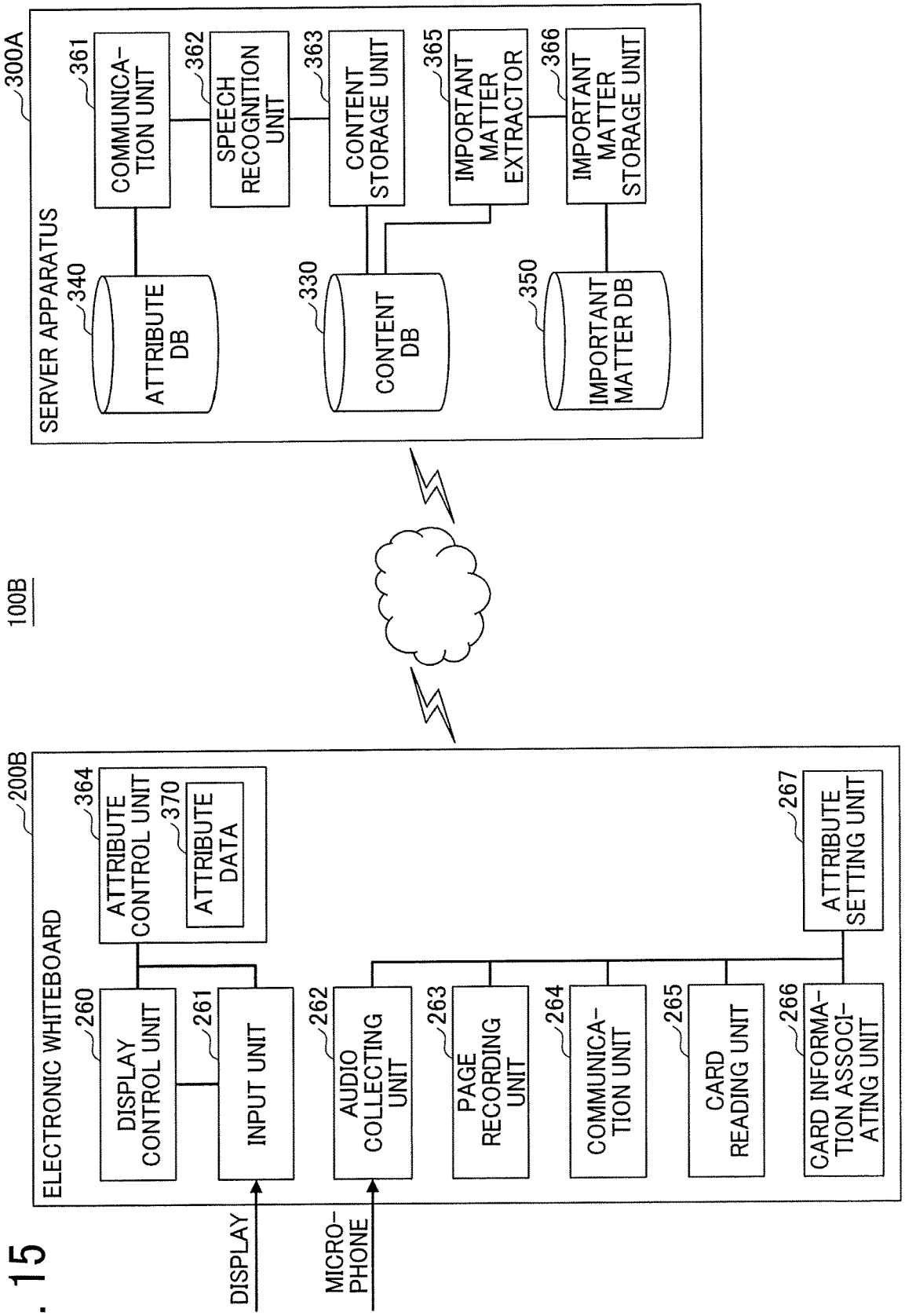
FIG. 15 is schematic diagram illustrating functions of each apparatus included in the information processing system, according to a third embodiment of the present disclosure.

FIG. 15 is schematic diagram illustrating functions of each apparatus included in the information processing system 100B, according to the third embodiment.

The information processing system 100B according to the present embodiment includes an electronic whiteboard 200B and the server apparatus 300A.

The electronic whiteboard 200B includes the display control unit 260, the input unit 261, the audio collecting unit 262, the page recording unit 263, the communication unit 264, the card reading unit 265, the card information associating unit 266, the attribute setting unit 267, and the attribute control unit 364. The attribute control unit 364 holds attribute data 370.

The server apparatus 300A according to the present embodiment includes the content database 330, the attribute database 340, the important matter database 350, the communication unit 361, the speech recognition unit 362, the content storage unit 363, the important matter extractor 365, and the important matter storage unit 366.

In the information processing system 100B according to the present embodiment, when the predetermined instruction is input at the electronic whiteboard 200B, the attribute control unit 364 instructs the display control unit 260 to set attribute information of a stroke image that is to be input next, to attribute information indicated by the attribute data 370.

When the input of the stroke image associated with the predetermined instruction is completed, the attribute control unit 364 of the electronic whiteboard 200B instructs the display control unit 260 to set attribute information of a stroke image that is to be input next to the previous attribute information.

As described above, the electronic whiteboard 200B according to the present embodiment has a configuration in which the electronic whiteboard 200 of the first embodiment further includes the attribute control unit 364. In another example, the electronic whiteboard 200A of the second embodiment can also include the attribute control unit 364.

In this case, when the shape detection unit 268 detects that an input stroke image has a shape matching the shape data 269, the attribute control unit 364 instructs the display control unit 260 to draw this stroke image as an image whose attribute information is the attribute information indicated by the attribute data 370.

According to the present embodiment, the electronic whiteboard 200B can set an attribute information of the stroke image to an attribute information indicated by the attribute data 370 in response to an input of the predetermined instruction, without communicating with the server apparatus 300A. Accordingly, communication load in the information processing system 100B is reduced.

Fourth Embodiment

Hereinafter, a description is given of a fourth embodiment of the present disclosure, with reference drawings. The fourth embodiment differs from the third embodiment in that the electronic whiteboard extracts an important matter. Therefore, the description of the fourth embodiment is given of the differences from the third embodiment. The same reference numerals are given to the same or corresponding functions or configurations as those of the third embodiment, and redundant descriptions thereof are omitted or simplified appropriately.

Figure 16:
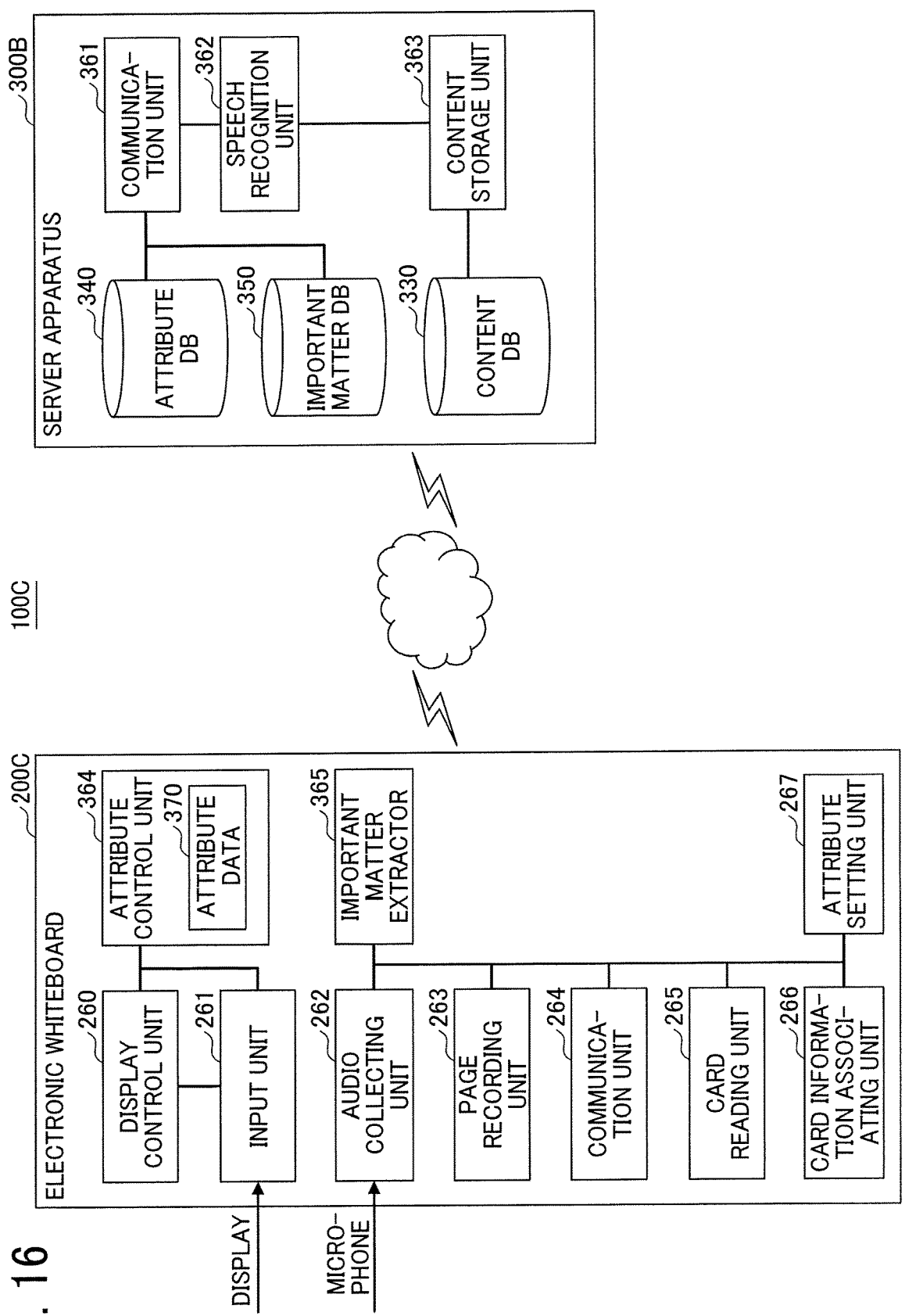
FIG. 16 is schematic diagram illustrating functions of each apparatus included in the information processing system, according to a fourth embodiment of the present disclosure.

FIG. 16 is schematic diagram illustrating functions of each apparatus included in the information processing system 100C, according to the fourth embodiment.

The information processing system 100C according to the present embodiment includes an electronic whiteboard 200C and the server apparatus 300B.

The electronic whiteboard 200C includes the display control unit 260, the input unit 261, the audio collecting unit 262, the page recording unit 263, the communication unit 264, the card reading unit 265, the card information associating unit 266, the attribute setting unit 267, the attribute control unit 364, and the important matter extractor 365.

The important matter extractor 365 extracts, from page data recorded by the page recording unit 263, image data in an area surrounded by a stroke image whose attribute information is the specific attribute information indicated by the attribute data 370, as important matter information.

The communication unit 264 of the electronic whiteboard 200C transmits, to the server apparatus 300B, the important matter information extracted by the important matter extractor 365.

The server apparatus 300B according to the present embodiment includes the content database 330, the attribute database 340, the important matter database 350, the communication unit 361, the speech recognition unit 362, the content storage unit 363, and the important matter storage unit 366.

In response to receiving the important matter information from the electronic whiteboard 200C, the important matter storage unit 366 of the server apparatus 300B stores the important matter information in the important matter database 350.

As described above, in the present embodiment, since the extraction of the important matter information is performed by the electronic whiteboard 200C, the processing load on the server apparatus 300B can be reduced.

Fifth Embodiment

Hereinafter, a description is given of a fifth embodiment of the present disclosure, with reference drawings. The fifth embodiment is different from the first embodiment in that an image projection apparatus is used in place of the electronic whiteboard 200 in the information processing system 100. Therefore, the description of the fifth embodiment is given of the differences from the first embodiment. The same reference numerals are given to the same or corresponding functions or configurations as those of the first embodiment, and redundant descriptions thereof are omitted or simplified appropriately.

Figure 17:
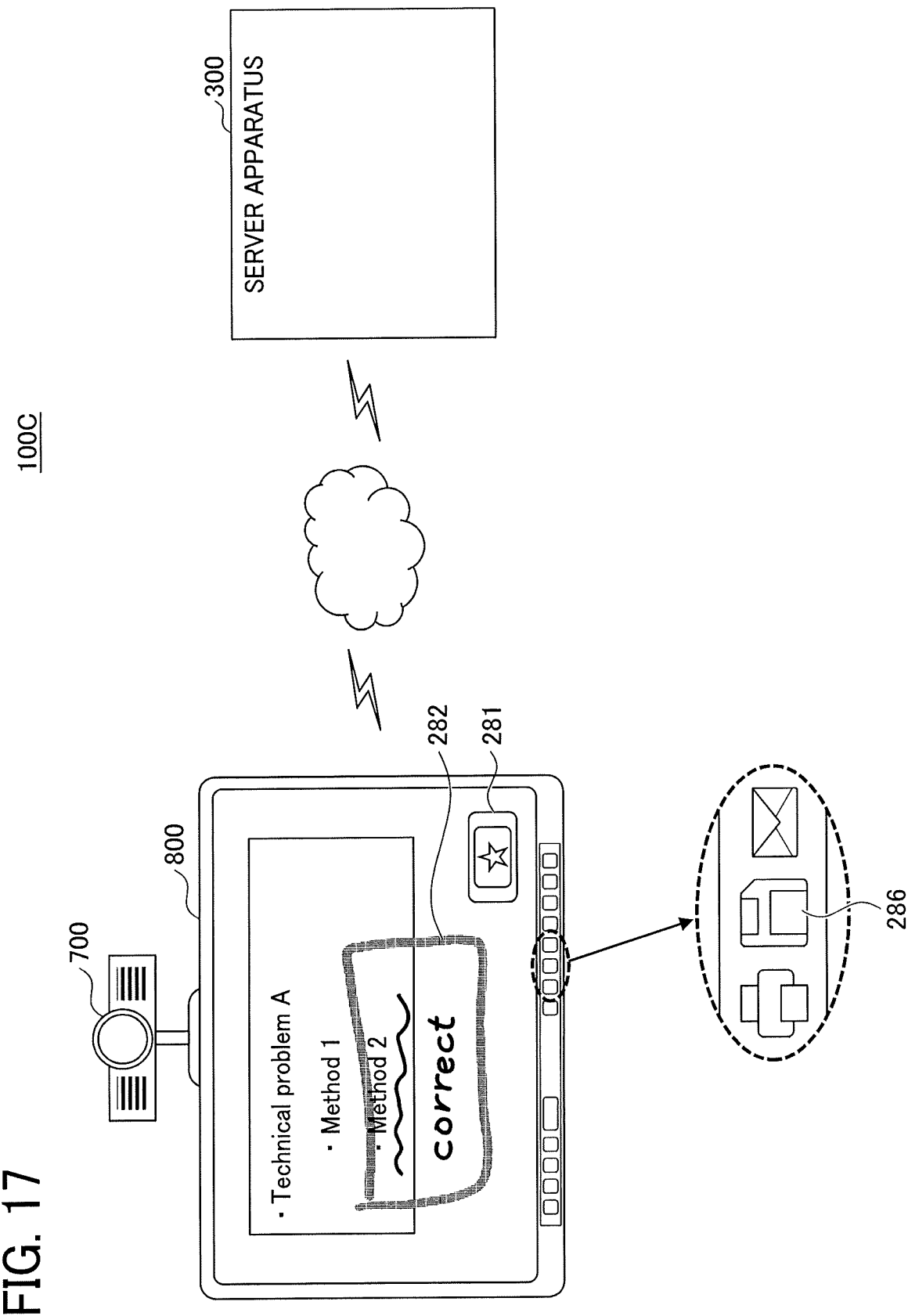
FIG. 17 is a schematic view illustrating an example of a configuration of the information processing system, according to a fifth embodiment of the present disclosure.

FIG. 17 is an illustration for explaining an overview of an information processing system 100C according to the fifth embodiment. The information processing system 100C illustrated in FIG. 17 includes an image projection apparatus (projector) 700 and the server apparatus 300.

The image projection apparatus 700 projects image data input from, for example, a terminal apparatus connected to the image projection apparatus 700 onto a screen 800. The screen 800 corresponds to the display 230. For example, a whiteboard, a wall surface, or the like can substitute as the screen 800.

Further, the image projection apparatus 700 detects movement of the electronic pen, user's hand, etc., to detect handwriting entry to the screen 800, and thereby projects a stroke image onto the screen 800.

In response to receiving a predetermined instruction, the image projection apparatus 700 according to the present embodiment transmits, to the server apparatus 300, a notification indicating that the predetermined instruction is received, in substantially the same manner as the first to fourth embodiments.

Specifically, for example, in response to detecting an operation to the instruction button 281 displayed on the screen 800, the image projection apparatus 700 instructs the display control unit 260 to draw the stroke image 282 to be input next with the attribute information indicated by the attribute data 370 received from the server apparatus 300.

Further, for example, in response to detecting an operation to a save button 286 displayed on the screen 800, the image projection apparatus 700 transmits, as a part of content data, image data of the image projected on the screen 800, to the server apparatus 300. The image data transmitted from the image projection apparatus 700 to the server apparatus 300 also contains a stroke image drawn by the electronic pen, the user's hand, etc.

Furthermore, for example, in response to detecting an operation to the save button 286, the image projection apparatus 700 outputs the image data to a portable storage medium such as a USB memory such that the image data is stored in the USB memory, in addition to transmitting the image data to the server apparatus 300.

As described above, according to the present embodiment, in the system including the image projection apparatus 700 and the server apparatus 300, when a user is to specify important matter information on the display 230, the user is saved from complicated operations for displaying indications indicating that it is an important matter. Accordingly, operability is improved when specifying an important matter to be extracted.

Hereinafter, a description is given of several variations of the information processing system of each of the above-described embodiments, with reference to FIGS. 18 to 20.

Figure 18:
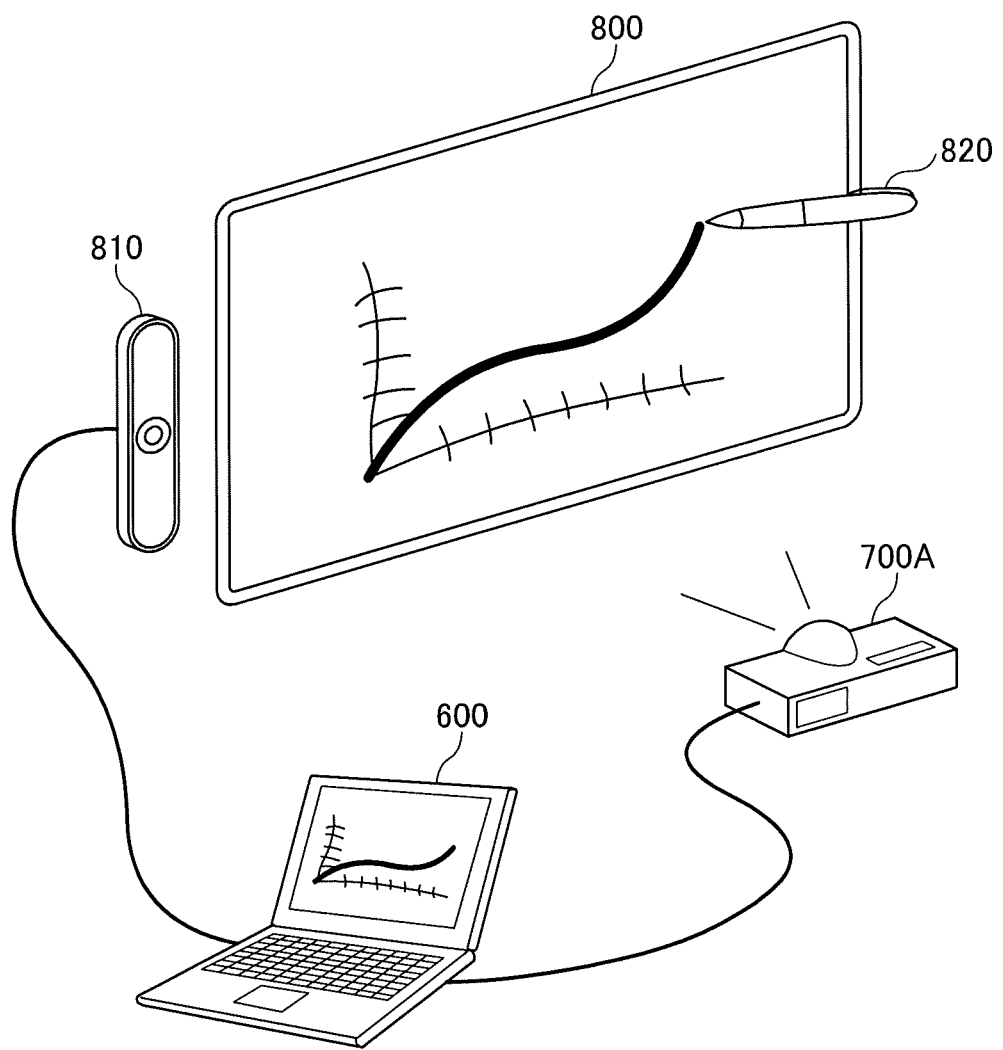
FIG. 18 is a diagram illustrating one variation of the information processing system.

FIG. 18 is a diagram illustrating one variation of the information processing system. In the example of FIG. 18, an information processing system according to the variation includes, instead of the electronic whiteboard 200, a terminal apparatus 600, an image projection apparatus 700A, and a pen motion detection apparatus 810.

The terminal apparatus 600 is cabled to the image projection apparatus 700A and the pen motion detection apparatus 810.

The image projection apparatus 700A projects image data input from the terminal apparatus 600 onto the screen 800.

The pen motion detection apparatus 810 communicates with an electronic pen 820 to detect the motion of the electronic pen 820 in the vicinity of the screen 800. Specifically, the pen motion detection apparatus 810 detects coordinate information indicating a position pointed by the electronic pen 820 on the screen 800. Further, the pen motion detection apparatus 810 transmits the coordinate information to the terminal apparatus 600.

Based on the coordinate information received from the pen motion detection apparatus 810, the terminal apparatus 600 generates image data of a stroke image input by the electronic pen 820, and causes the image projection apparatus 700A to project the stroke image on the screen 800.

Further, in response to receiving a predetermined instruction, the terminal apparatus 600 sets attribute information of the stroke image associated with the predetermined instruction to the specific attribute information indicated by the attribute data 370, in substantially the same manner as the first to fourth embodiments.

Furthermore, the terminal apparatus 600 transmits, as a part of content data, image data of the image projected by the image projection apparatus 700A, to the server apparatus 300.

Figure 19:
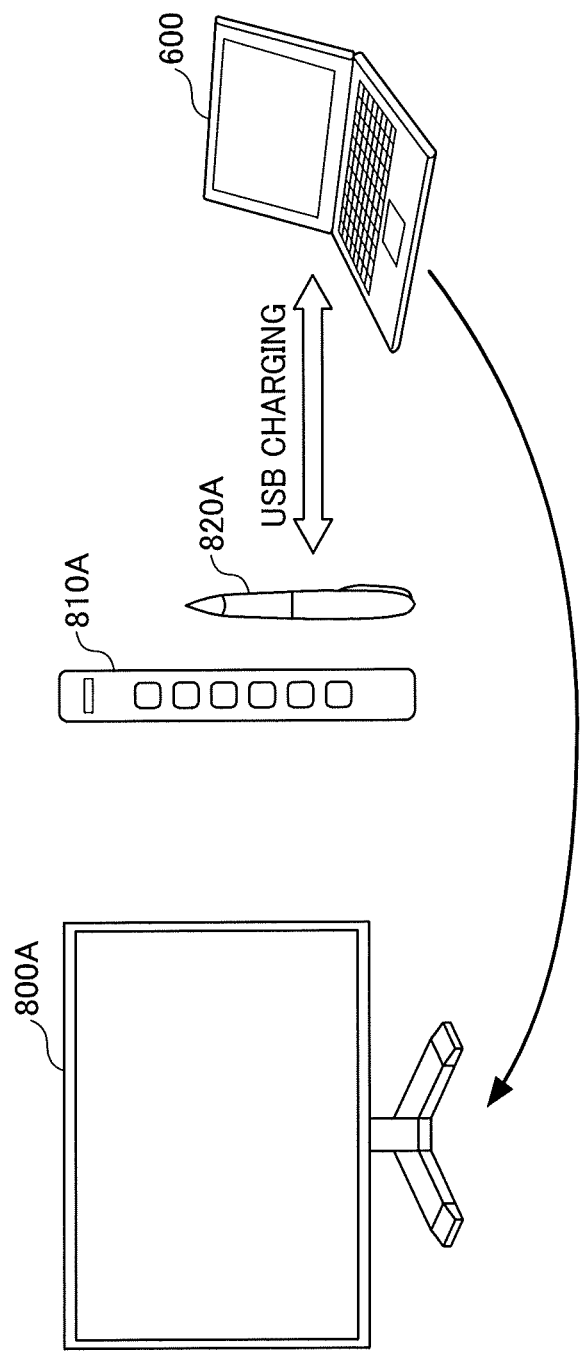
FIG. 19 is a diagram illustrating another variation of the information processing system.

FIG. 19 is a diagram illustrating another variation of the information processing system. In the example of FIG. 19, an information processing system according to the variation includes, instead of the electronic whiteboard 200, the terminal apparatus 600, a display 800A, and the pen motion detection apparatus 810.

The pen motion detection apparatus 810, which is disposed in the vicinity of the display 800A, detects coordinate information indicating a position pointed by an electronic pen 820A on the display 800A. Further, the pen motion detection apparatus 810 transmits the coordinate information to the terminal apparatus 600. In the example of FIG. 19, the electronic pen 820A can be charged from the terminal apparatus 600 via a USB connector.

Based on the coordinate information received from the pen motion detection apparatus 810, the terminal apparatus 600 generates image data of a stroke image input by the electronic pen 820. The terminal apparatus 600 displays an image based on the image data of the stroke image on the display 800A.

Further, in response to receiving a predetermined instruction, the terminal apparatus 600 sets attribute information of the stroke image associated with the predetermined instruction to the specific attribute information indicated by the attribute data 370, in substantially the same manner as the first to fourth embodiments.

Furthermore, the terminal apparatus 600 transmits, as a part of content data, image data of the image displayed on the display 800A, to the server apparatus 300.

Figure 20:
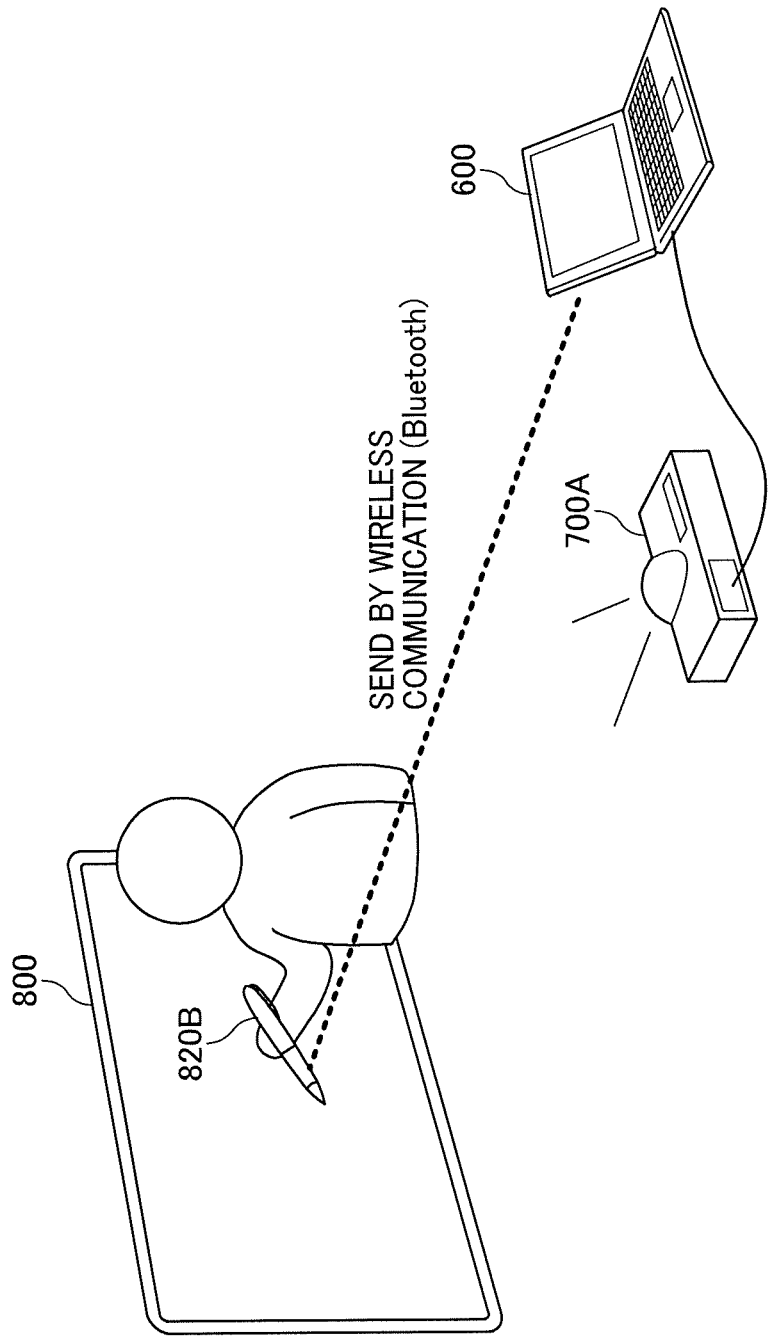
FIG. 20 is a diagram illustrating still another variation of the information processing system.

FIG. 20 is a diagram illustrating still another variation of the information processing system. In the example of FIG. 20, an information processing system according to the variation includes, instead of the electronic whiteboard 200, the terminal apparatus 600 and the image projection apparatus 700A.

The terminal apparatus 600 communicates with an electronic pen 820B through a wireless network such as Bluetooth, to receive coordinate information of a position pointed by the electronic pen 820B on the screen 800. Based on the received coordinate information, the terminal apparatus 600 generates image data of a stroke image input by the electronic pen 820B, and causes the image projection apparatus 700A to project the stroke image.

Further, in response to receiving a predetermined instruction, the terminal apparatus 600 sets attribute information of the stroke image associated with the predetermined instruction to the specific attribute information indicated by the attribute data 370, in substantially the same manner as the first to fourth embodiments.

Furthermore, the terminal apparatus 600 transmits, as a part of content data, image data of the image projected by the image projection apparatus 700A, to the server apparatus 300.

As described above, each of the embodiments can be applied to various system configurations.

Although in the above-described embodiments, the predetermined instruction is made by tapping the specific position on the display 230 or by detecting a stroke image having a specific shape, this is just one example.

In another example, the predetermined instruction is made by detecting specific audio data (voice command) from audio data collected by the audio collecting unit 262 via the microphone 2200.

In still another example, the predetermined instruction is made by detecting a face of a specific user, a specific operation of a user, or the like from image data captured by the camera 2400. In still another example, the predetermined instruction is made according to a result of communication between the electronic whiteboard 200 and an electroencephalograph being attached to a user.

In still another example, the predetermined instruction is made according to a result of detection of the line of sight of a user by using a head mounted display (HMD) or an eye camera, worn by the user.

According to one or more embodiments of the present disclosure, operability is improved.

Each of the functions of the described embodiments can be implemented by one or more processing circuits or circuitry. Processing circuitry includes a programmed processor, as a processor includes circuitry. A processing circuit also includes devices such as an application specific integrated circuit (ASIC), a digital signal processor (DSP), a field programmable gate array (FPGA), a system on a chip (SOC), a graphics processing unit (GPU), and conventional circuit components arranged to perform the recited functions.

The above-described embodiments are illustrative and do not limit the present disclosure. Thus, numerous additional modifications and variations are possible in light of the above teachings. For example, elements and/or features of different illustrative embodiments may be combined with each other and/or substituted for each other within the scope of the present disclosure. Any one of the above-described operations may be performed in various other ways, for example, in an order different from the one described above.

What is claimed is:

1. An electronic whiteboard comprising circuitry configured to receive a predetermined instruction, in response to receiving the predetermined instruction, change attribute information of a stroke image associated with the predetermined instruction to specific attribute information, the specific attribute information identifying information in an area defined by the stroke image as information to be extracted, and control a display to display the stroke image associated with the predetermined instruction as a stroke image whose attribute information is the specific attribute information, wherein:

the predetermined instruction is received when an instruction button of the display is tapped, and the stroke image associated with the predetermined instruction is a stroke image that is input after the predetermined instruction is received, the circuitry is further configured to:

extract, as important matter information, information identified as the information to be extracted, from page data indicating a page of a screen displayed on the display; and store the important matter information in an important matter database, the important matter information is image data in the area defined by the stroke image whose attribute information is the specific attribute information, and the predetermined instruction which is received causes both the change of attribute information of the stroke, and the extracting, as important matter information, the information identified as the information to be extracted.

2. The electronic whiteboard of claim 1, wherein the circuitry is further configured to set the specific attribute information to previous attribute information that was set before the circuitry changes the attribute information, when an input of the stroke image associated with the predetermined instruction is completed.

3. The electronic whiteboard of claim 1, wherein the circuitry is further configured to detect that a stroke image that is input has a shape indicated by shape data that is stored in advance, the predetermined instruction is received when the circuitry detects that the stroke image that is input has the shape indicated by the shape data, and the stroke image associated with the predetermined instruction is a stroke image that is input immediately before the predetermined instruction is received.

4. The electronic whiteboard of claim 1, wherein the stroke image associated with the predetermined instruction is a stroke image that is input within a specific period of time after the predetermined instruction is received.

5. The electronic whiteboard of claim 1, wherein the attribute information includes at least any one of a line type, a line color, and a line width of the stroke image.

6. The electronic whiteboard of claim 1, wherein:

the stroke image associated with the predetermined instruction is a stroke image that is input immediately after the predetermined instruction is received.

7. An information processing system, comprising:

an electronic whiteboard; and an information processing apparatus communicable with the electronic whiteboard, wherein the information processing apparatus includes first circuitry configured to:

in response to receiving a notification indicating that the electronic whiteboard receives a predetermined instruction, change attribute information of a stroke image associated with the predetermined instruction to specific attribute information, the specific attribute information identifying information in an area defined by the stroke image as information to be extracted; and to transmit the specific attribute information to the electronic whiteboard, and the electronic whiteboard includes second circuitry configured to:

receive the predetermined instruction; and in response to receiving the specific attribute information, to control a display provided with the electronic whiteboard to display the stroke image associated with the predetermined instruction as a stroke image whose attribute information is the specific attribute information, wherein:
the predetermined instruction is received when an instruction button of the display is tapped,
the stroke image associated with the predetermined instruction is a stroke image that is input after the predetermined instruction is received,
the circuitry is further configured to:
- extract, as important matter information, information identified as the information to be extracted, from page data indicating a page of a screen displayed on the display; and
- store the important matter information in an important matter database, the important matter information is image data in the area defined by the stroke image whose attribute information is the specific attribute information, and
the predetermined instruction which is received causes both the change of attribute information of the stroke, and the extracting, as important matter information, the information identified as the information to be extracted.

8. The information processing system of claim 7, wherein:
the stroke image associated with the predetermined instruction is a stroke image that is input immediately after the predetermined instruction is received.

9. A display control method performed by an electronic whiteboard, the method comprising:
receiving a predetermined instruction;
in response to receiving the predetermined instruction, changing attribute information of a stroke image associated with the predetermined instruction to specific attribute information, the specific attribute information identifying information in an area defined by the stroke image as information to be extracted; and
controlling a display provided with the electronic whiteboard to display the stroke image associated with the predetermined instruction as a stroke image whose attribute information is the specific attribute information,
wherein the receiving includes receiving the predetermined instruction in response to tapping an instruction button of a display, and
wherein the stroke image associated with the predetermined instruction is a stroke image that is input after the predetermined instruction is received,
wherein the method further comprises:
extracting, as important matter information, information identified as the information to be extracted, from page data indicating a page of a screen displayed on the display; and
storing the important matter information in an important matter database,
wherein the important matter information is image data in the area defined by the stroke image whose attribute information is the specific attribute information, and
wherein the predetermined instruction which is received causes both the change of attribute information of the stroke, and the extracting, as important matter information, the information identified as the information to be extracted.

10. The method of claim 9, wherein:
the stroke image associated with the predetermined instruction is a stroke image that is input immediately after the predetermined instruction is received.

* * * * *